(12) United States Patent
Broder et al.

(10) Patent No.: US 7,818,312 B2
(45) Date of Patent: Oct. 19, 2010

(54) METHODS AND APPARATUS FOR ASSESSING WEB PAGE DECAY

(75) Inventors: Andrei Zary Broder, Bronx, NY (US);
Ziv Bar-Yossef, Ra'anana (IL);
Shanmagasundaram Ravikumar, Cupertino, CA (US); Andrew Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/955,458

(22) Filed: Dec. 13, 2007

(65) Prior Publication Data
US 2008/0097988 A1    Apr. 24, 2008

Related U.S. Application Data

(62) Division of application No. 10/995,770, filed on Nov. 22, 2004, now abandoned.

(51) Int. Cl.
*G06F 7/00* (2006.01)
*G06F 17/30* (2006.01)

(52) U.S. Cl. .................................................. 707/709

(58) Field of Classification Search ................. 707/709, 707/999.003–999.006
See application file for complete search history.

(56) References Cited

U.S. PATENT DOCUMENTS 5,860,071 A * 1/1999 Ball et al. ................... 707/100

7,707,229 B2 * 4/2010 Tiyyagura ................... 707/802
2004/0064471 A1 * 4/2004 Brown et al. ................ 707/100
2005/0256860 A1 * 11/2005 Eiron et al. ..................... 707/4

OTHER PUBLICATIONS

Bar-Yossef et al., "Sic Transit Telae: Towards an Understanding of the Web's Decay," May 17-22, 2004, 328-337.*
Eiron et al., "Ranking the Web Frontier," May 17-22, 2004, 309-318.*
Michel, "Dead Link Check," (http://web.archive.org/web/20030806074242/http://dlc.sourceforge.net/dlc-0.4.0.html), Aug. 6, 2003, 1-8.*
Hausherr, "Xenu's Link Sleuth" (http://web.archive.org/web/20031003215928/http://home.snafu.de/tilman/xenulink.html), Oct. 3, 2003, 1-11.*

(Continued)

*Primary Examiner*—Jean B. Fleurantin
*Assistant Examiner*—Aleksandr Kerzhner
(74) *Attorney, Agent, or Firm*—Harrington & Smith

(57) ABSTRACT

A signal-bearing medium is disclosed that includes operations including establishing a link threshold, wherein a web page will be assessed as lacking currency if a percentage of hyperlinks contained in the web page that link to an active page is less than the link threshold, accessing a web page containing hyperlinks, and testing the hyperlinks. Testing includes: selecting a hyperlink; and monitoring a number of redirects encountered by following the selected hyperlink until a final web page is reached or a failure occurs, and assessing the selected hyperlink as linking to a dead web page if a redirect limit is exceeded, the redirect limit greater than one, wherein exceeding the redirect limit causes occurrence of a failure. The operations also include calculating a percentage of hyperlinks that return active web pages, and comparing the percentage of hyperlinks that return active web pages with the link threshold.

25 Claims, 12 Drawing Sheets

OTHER PUBLICATIONS

Fielding et al., "Hypertext Transfer Protocol—HTTP/1.1" (http://web.archive.org/web/20030811234917/http://www.w3.org/Protocols/rfc2616/rfc2616-sec10.html), Aug. 11, 2003, 1-11.*

Yahoo Crawler, "Why is your crawler asking for strange URLs that have never existed on my site?" (http://help.yahoo.com/l/au/yahoo7/search/webcrawler/slurp-10.html), Aug. 24, 2007, 1.*

W. Aiello, F. Chung, and L. Lu. A random graph model for power law graphs. *Experimental Mathematics*, 10:53-66, 2001.

Z. Bar-Yossef, A. Berg, S. Chien, J. Fakcharoenphol, and D. Weitz. Approximating aggregate queries about web pages via random walks. In *Proceedings of the 26th International Conference on Very Large Databases*, pp. 535-544, 2000.

A.-L. Barabasi and R. Albert., Emergence of scaling in random networks, *Science*, 286:509-512, 1999.

K. Bharat, A. Broder, M. Henzinger, P. Kumar, and S. Venkatasubramanian. The connectivity server: Fast access to linkage information on the Web. In *Proceedings of the 7th International World Wide Web Conference*, pp. 104-111, 1998.

K. Bharat and M. Henzinger, Improved algorithms for topic distillation in a hyperlinked environment, In *Proceedings of the 21st Annual International ACM SIGIR Conference on Research and Development in Information Retrieval*, pp. 104-111, 1998.

B. Brewington and G. Cybenko, How dynamic is the web? In *Proceedings of the Ninth International World Wide Web Conference*, pp. 257-276, May 2000.

S. Brin and L. Page, The anatomy of a large-scale hypertextual Web search engine., In *Proceedings of the 7th International World Wide Web Conference*, pp. 107-117, 1998.

A. Z, Broder, S. C. Glassman, M. S. Manasse, and G. Zweig, Syntactic clustering of the Web, In *Proceedings of the 6th International World Wide Web Conference*, pp. 391-404, 1997.

A. Z. Broder, R. Kumar, F. Maghoul, P. Raghavan, S. Rajagopalan, R. Stata, A. Tomkins, and J. Wiener, Graph structure in the web., WWW9/Computer Networks, 33(1-6):309-320, 2000.

A. Z. Broder, R. Lempel, F. Maghoul, and J. Pedersen, Efficient Pagerank approximation via graph aggregation, Manuscript, May 17, 2004.

S. Chakrabarti, M. van den Berg, and B. Dom, Focused crawling: a new approach to topic-specific web resource discovery, *WWW8/Computer Networks*, 31(11-16): 1623-1640, 1999.

J. Cho and H. Garcia-Molina. The evolution of the web and implications for an incremental crawler. In *Proceedings of the 26th International Conference on Very Large Databases*, pp. 200-209, 2000.

F. Douglis, A. Feldmann, B. Krishnamurthy, and J. C. Mogul. Rate of change and other metrics: a live study of the world wide web, In *USINEX Symposium on Internet Technologies and Systems*, 1997.

B. Edelman. Domains reregistered for distribution of unrelated content: A case study of "Tina's Free Live Webcam". http://cyber.law.harvard.edu/people/edelman/renewals/, 2002.

D. Fetterly, M. Manasse, M. Najork, and J. L. Wiener. A large-scale study of the evolution of web pages. In *Proceedings of the 12th International World Wide Web Conference*, pp. 669-678, 2003.

R. Fielding, J. Gettys, J. Mogul, H. Frystyk, L. Masinter, P. Leach, and T. Berners-Lee.RFC2616: Hypertext Transfer Protocol—HTTP/1.1, http://www.w3.org/Protocols/rfc2616/rfc2616.html, Jun. 1999.

T. Haveliwala. Topic-sensitive PageRank. In *Proceedings of the 11th International World Wide Web Conference*, pp. 517-526, 2002.

M. Henzinger, A. Heydon, M. Mitzenmacher, and M. Najork. On near-uniform URL sampling. *WWW9/Computer Networks*, 33(1-6):295-308, 2000.

A. Jesdanun. Internet littered with dead web sites, http://story.news.yahoo.com/news?tmpl=story&u=/ap/20031102/ap_on_hi_te/deadwood_online_1, Nov. 2002.

J. M. Kleinberg.Authoritative sources in a hyperlinked environment, *Journal of the ACM*, 46(5):604-632, 1999.

R. Kumar, P. Raghavan, S. Rajagopalan, D. Sivakumar, A. Tomkins, and E. Upfal. Stochastic models for the web graph. *In Proceedings of the 41st IEEE Annual Foundations of Computer Science*, pp. 57-65, 2000.

A. Ntoulas, J. Cho, and C. Olston. What's new on the web? The evolution of the web from a search engine perspective. In *Proceedings of the 13th International World Wide Web Conference*, 2004.

G. Pandurangan, P. Raghavan, and E. Upfal. Using PageRank to characterize web structure. In *Computing and Combinatorics: 8th Annual International Conference*, pp. 330-339, 2002.

P. Rusmevichientong, D. M. Pennock, S. Lawrence, and C. L. Giles, Methods for sampling pages uniformly from the world wide web, In *Proceedings of the AAAI Fall Symposium on Using Uncertainty Within Computation*, pp. 121-128, 2001.

J. L. Wolf, M. S. Squillante, P. S. Yu, J. Sethuraman, and L. Ozsen. Optimal crawling strategies for web search engines. In *Proceedings of the 11th International World Wide Web Conference*, pp. 136-147, 2002.

S. Chakrabarti, B. Dom, D. Gibson, R. Kumar, P. Raghavan, S. Rajagopalan, and A. Tomkins, "Spectral filtering for resource discovery", In Proceedings of the ACM SIGIR Workshop on Hypertext Analysis, 1998, pp. 13-21.

W. Koehler, "Analysis of web page and web site constancy and permanence", Journal of the American Society for Information Science, 50(2):162-180, 1999.

W. Koehler, "Digital libraries and world wide web sites and page persistence", Information Research, 4(4), 1999, 18 pgs.

K. Kokoszkiewicz (a.k.a. Alectorides Conradus), "Vocabula Computatralia", Anglico-Latinum, University of Warsaw, Centre for Studies on the Classical Tradition in Poland and East-Central Europe (OBTA), http://www.obta.uw.edu.pl/~draco/docs/voccomp.html, Oct. 10, 2004, 8 pgs.

J. Markwell and D. W. Brooks, "Broken links: The ephemeral nature of educational WWW hyperlinks", Journal of Science Education and Technology, 11(2):105-108, 2002.

J. Markwell and D. W. Brooks, "'Link rot' limits the usefulness of web-based educational materials in biochemistry and molecular biology", Biochemistry and Molecular Biology Education, 31(1):69-72, 2003, 4 pgs.

* cited by examiner

METHODS AND APPARATUS FOR ASSESSING WEB PAGE DECAY

CROSS REFERENCE TO RELATED APPLICATION

This is a divisional patent application of U.S. patent application Ser. No. 10/995,770 filed Nov. 22, 2004 now abandoned.

TECHNICAL FIELD

The present invention generally concerns web pages and more particularly concerns methods and apparatus for assessing the decay of web pages.

BACKGROUND

The rapid growth of the web has been noted and tracked extensively. Recent studies, however, have documented the dual phenomenon: web pages often have small half-lives, and thus the web exhibits rapid decay as well. Consequently, page creators are faced with an increasingly burdensome task of keeping links up to date, and many fall behind. In addition to individual pages, collections of pages or even entire neighborhoods on the web exhibit significant decay, rendering them less effective as information resources. Such neighborhoods are identified by frustrated searchers, seeking a way out of these stale neighborhoods, back to more up-to-date sections of the web.

On Nov. 2, 2003, the Associated Press reported that the "Internet [is] littered with abandoned sites." [20] The story was picked up by many news outlets from USA's CNN to Singapore's Straits Times. The article further states that [d]espite the Internet's ability to deliver information quickly and frequently, the World Wide Web is littered with deadwood—sites abandoned and woefully out of date."

Of course this is not news to most net-denizens, and speed of delivery has nothing to do with the quality of content, but there is no denial that the increase in the number of outdated sites has made finding reliable information on the web even more difficult and frustrating. Part of the problem is an issue of perception: the immediacy and flexibility of the web create the expectation that the content is up-to-date; after all, in a library no one expects every book to be current, but, on the other hand, it is clear that books once published do not change, and it is fairly easy to find the publication date.

While there have been substantial efforts in mapping and understanding the growth of the web, there have been fewer investigations of its death and decay. Determining whether a URL is dead or alive is quite easy, at least in the first approximation, and, in fact, it is known that web pages disappear at a rate of 0.25-0.5%/week. However, determining whether a web page has been abandoned is much more difficult.

Thus, those skilled in the art desire a method for assessing the decay status or "staleness" of a web page. In addition, those skilled in the art desire methods for assessing the staleness of a web page so that the method can be used as a way of ranking web pages. Further, those skilled in the art desire methods and apparatus for use in web maintenance activities. Methods and apparatus that accurately assess the staleness of web pages are particularly useful in managing web maintenance activities.

SUMMARY OF THE PREFERRED EMBODIMENTS

A first alternate embodiment of the present invention comprises a signal-bearing medium tangibly embodying a program of machine-readable instructions executable by a digital processing apparatus of a computer system to perform operations for assessing the currency of a web page, the operations comprising: establishing a date threshold, wherein web pages older than the date threshold will be assessed at not being current; accessing a web page; extracting date information from the web page identifying the age of the web page; and comparing the date information extracted from the web page to the date threshold.

A second alternate embodiment of the present invention comprises a signal-bearing medium tangibly embodying a program of machine-readable executable by a digital processing apparatus of a computer system to perform operations for assessing the currency of a web page, the operations comprising: receiving a user-specified topicality threshold, where the topicality threshold concerns the topicality of material content of the web page; accessing a web page; extracting topicality information from the web page; and comparing the topicality information extracted from the web page to the topicality threshold.

A third alternate embodiment of the present invention comprises: a signal-bearing medium tangibly embodying a program of machine-readable instructions executable by a digital processing apparatus of a computer system to perform operations for assessing the currency of a web page, the operations comprising: establishing a link threshold, wherein a web page will be assessed as lacking currency if a percentage of hyperlinks contained in the web page that link to an active page is less than the link threshold; accessing a web page containing hyperlinks; testing the hyperlinks; calculating the percentage of hyperlinks that return active web pages; and comparing the percentage of hyperlinks that return active web pages with the link threshold.

A fourth alternate embodiment of the present invention comprises: a signal-bearing medium tangibly embodying a program of machine-readable instructions executable by a digital processing apparatus of a computer system to perform operations for assessing the decay of a web page, the operations comprising: accessing a subject web page containing hyperlinks; assessing the decay of the subject web page by following a random walk away from the subject web page, where the random walk consists of a testing of links on the subject web page and web pages linked to the subject web page under test; and assigning a decay score to the subject web page in dependence on dead links encountered in the random walk, wherein the decay score is a weighted sliding scale, where a dead link encountered relatively close in the random walk to the subject web page in terms of intermediate web pages results in a higher decay score than a dead link encountered relatively farther away from the subject web page.

A fifth alternate embodiment of the present invention comprises: a computer system for assessing the currency of a web page, the computer system comprising: an internet connection for connecting to the internet and for accessing web pages available on the internet; at least one memory to store web pages retrieved from the internet and at least one program of machine-readable instructions, where the at least one program performs operations to assess the currency of a web page; at least one processor coupled to the internet connection and the at least one memory, where the at least one processor performs the following operations when the at least one program is executed: retrieving a date threshold, wherein web pages older than the date threshold will be assessed as not being current; accessing a web page; extracting date information from the web page identifying the age of the web page; and comparing the date information extracted from the web page to the date threshold.

A sixth alternate embodiment of the present invention comprises: a computer system for assessing the currency of a web page, the computer system comprising: an internet connection for connecting to the internet and for accessing web pages available on the internet; at least one memory to store web pages retrieved from the internet and at least one program of machine-readable instructions, where the at least one program performs operations to assess the currency of a web page; at least one processor coupled to the internet connection and the at least one memory, where the at least one processor performs the following operations when the at least one program is executed: retrieving a predetermined topicality threshold, where the topicality threshold, where the topicality threshold concerns the topicality of material comprising a web page; extracting topicality information from the web page; and comparing the topicality information extracted from the web page to the topicality threshold.

A seventh alternate embodiment of the present invention comprises: a computer system for assessing the currency of a web page, the computer system comprising: an internet connection for connecting to the internet and for accessing web pages available on the internet; at least one memory to store web pages retrieved from the internet and at least one program of machine-readable instructions, where the at least one program performs operations to assess the currency of a web page; at least one processor coupled to internet connection and the at least one memory, where the at least processor performs the following operations when the at least one program is executed; establishing a link threshold, wherein a web page will be assessed as lacking currency if a percentage of hyperlinks contained in the web page that link to an active page is less than the link threshold; accessing a web page containing hyperlinks; testing the hyperlinks; calculating the percentage of hyperlinks that return active web pages; and comparing the percentage of hyperlinks that return active web pages with the link threshold.

An eighth alternate embodiment of the present invention comprises: a computer system for assessing the decay of a web page comprising: an internet connection for connecting to the internet and for accessing web pages available on the internet; at least one memory to store web pages retrieved from the internet and at least one program of machine-readable instructions, where the at least one program performs operations to assess the decay of web page; at least one processor coupled to the internet connection and the at least one memory, where the at least one processor performs the following operations when the at least one program is executed: accessing a subject web page containing hyperlinks; assessing the decay of the subject web page by following a random walk away from the subject web page, where the random walk consists of a testing of links on the subject web page and web pages linked to the subject web page under test; and assigning a decay score to the subject web page in dependence on dead links encountered in the random walk, wherein the decay score is a weighted sliding scale, where a dead link encountered relatively close in the random walk to the subject web page in terms of intermediate web pages results in a higher decay score than a dead link encountered relatively farther away from the subject web page.

Thus it is seen that embodiments of the present invention overcome the limitations of the prior art. In particular, in the prior art there was no known way to assess the currency of a webpage. In contrast, the apparatus and methods of the present invention provide a reliable and accurate method for assessing the currency of a webpage.

The methods and apparatus of the present invention are particularly useful in combination with web ranking and enterprise web management applications. In web ranking situations, it is not desirable to assign a high ranking to a web page that is grossly out of date. Accordingly, having an accurate assessment of the currency of a web page is one factor that may be used in ranking a particular web page.

In enterprise web management situations, proprietors of web-based services wish to continually assess the currency of the web pages constituting their web-based services. Thus, having methods and apparatus that can accurately assess the currency of web pages are particularly useful in managing maintenance activities.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
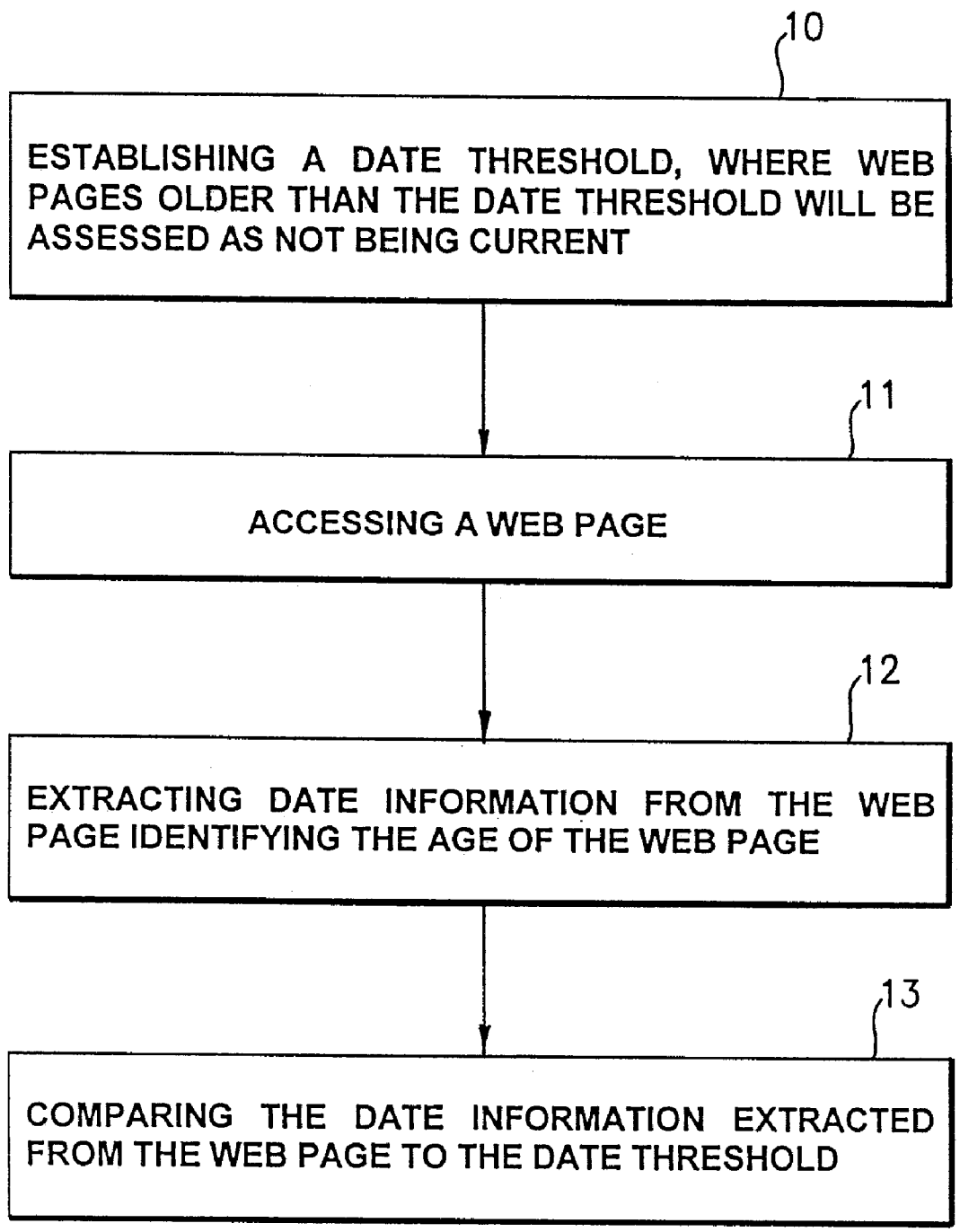
FIG. 1 is a flowchart depicting the steps of a method operating in accordance with an embodiment of the present invention.

A method for assessing the currency of a web page operating in accordance with the present invention is depicted in FIG. 1. In step 10, a date threshold is established, where web pages older than the date threshold will be assessed as not being current. Next, at step 11, a web page is accessed over the internet. Then, at step 12 date information is extracted from the web page identifying the age of the web page. In alternate embodiments, the "last-modified" information may be extracted from the web page, indicating when the web page was last modified. Next, at step 13, the date information extracted from the web page is compared to the date threshold. If the date information extracted from the web page is older than the date threshold, the web page is assessed as lacking currency; if it is younger, the web page is assessed as being current.

Figure 2:
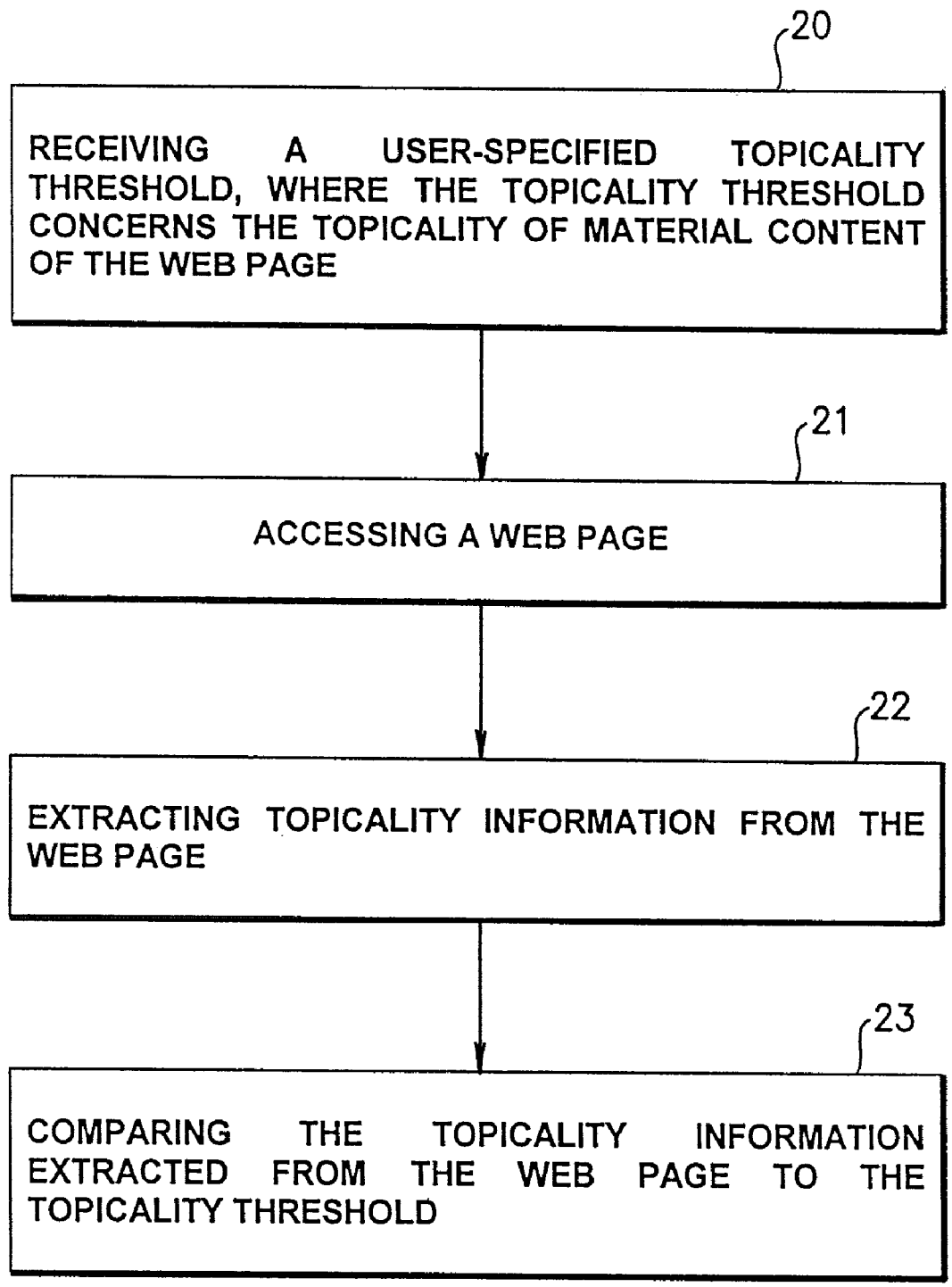
FIG. 2 is a flowchart depicting the steps of a method operating in accordance with an embodiment of the present invention.

Another method operating in accordance with the present invention is depicted in FIG. 2. At step 20, the method receives a user-specified topicality threshold, where the topicality threshold concerns the topicality of material content of the web page. As used herein, "topical" means a web page whose content or subject matter is current or up-to-date; a web page the content of which is not "topical" is outmoded or out-of-date. The topicality threshold can be specified in a number of ways. For example, the topicality threshold can concern date references within the content of the web page. Alternatively, the topicality threshold can concern historical events the presence of which would indicate that the page is out of date. Further, the topicality threshold can be set by using product identifiers. If a researcher sought to assess the currency of web pages concerning computer hardware, the researcher could use product identifiers as indicia of whether a web page is up to date. For example, a web page discussing Pentium III processors for non-historical reasons would be out of date. Then, at step 21 a web page is accessed over the internet. Next, at step 22 topicality information is extracted from the web page. Then, at step 23, the topicality information extracted from the web page is compared to the topicality threshold. If the comparison reveals that the information extracted from the web page lacks topicality when compared to the topicality threshold, the web page is assessed as lacking currency. Alternatively, if the information extracted from the web page is topical when compared to the topicality threshold, the web page is assessed as being current.

Figure 3:
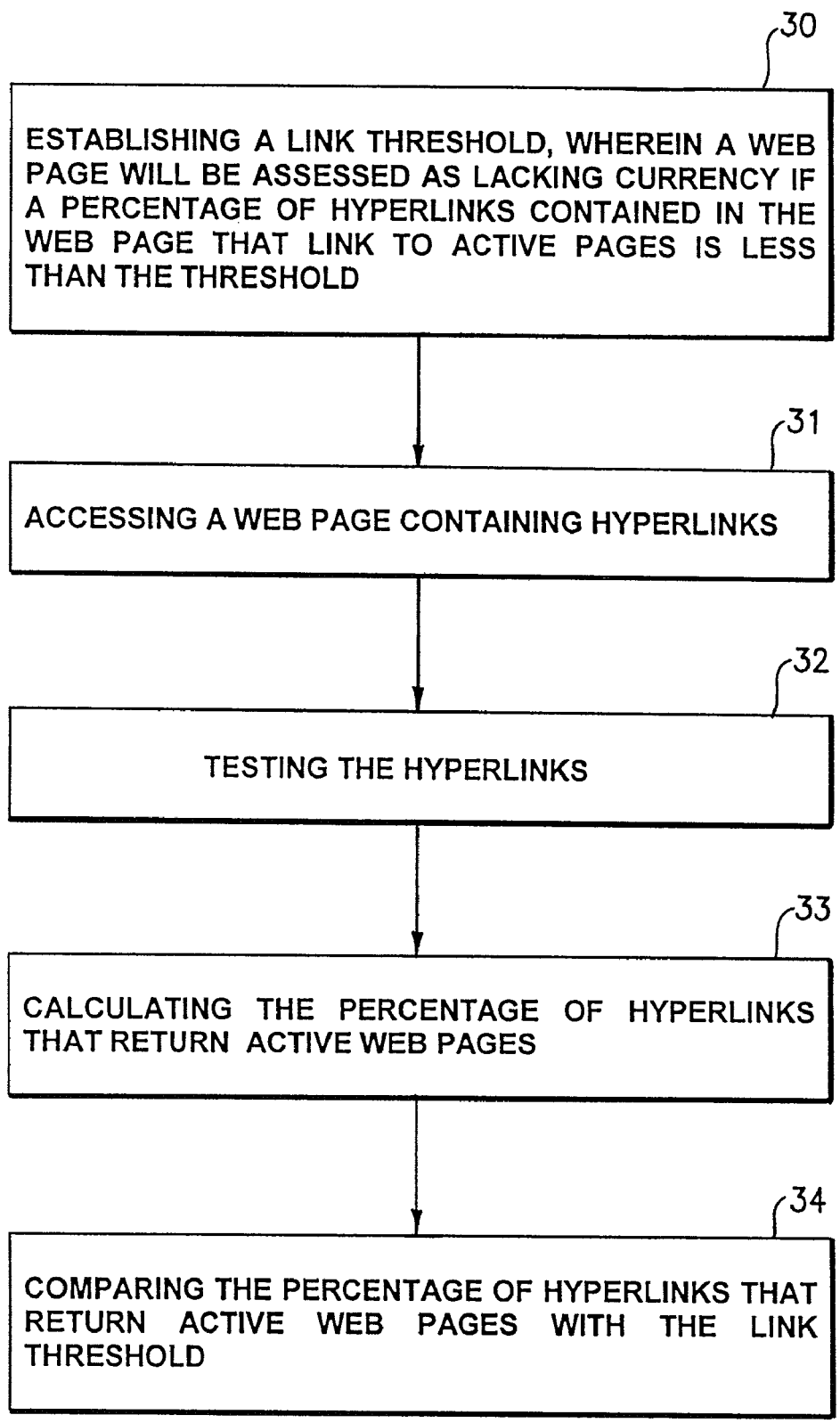
FIG. 3 is a flowchart depicting the steps of a method operating in accordance with an embodiment of the present invention.

A further method operating in accordance with the present invention is depicted in FIG. 3. At step 30, a link threshold is established, where a web page will be assessed as lacking currency if a percentage of hyperlinks contained in the web page that link to active web pages is less than the threshold. Next, at step 31, a web page containing hyperlinks is accessed over the internet. Then, at step 32, the hyperlinks contained in the web page are tested. Next, at step 33, the percentage of web pages that return active web pages is calculated. Then, at step 34, the percentage hyperlinks that return active web pages is compared with the link threshold. If the percentage is less than the link threshold, the web page is assessed as lacking currency; if is greater than the link threshold, the web page is assessed ads being current. One of ordinary skill in the art will understand that the link threshold could have been set in terms of hyperlinks which do not return active web pages.

The next aspect of the present invention concerns assessing whether a hyperlink does, in fact, link to a dead page. Dead links are the clearest giveaway to the obsolescence of a page. Indeed, this phenomenon of "link-rot" has been studied in several areas—for example, Fetterly et al. [16] in the context of web research, Koehler [22, 23] in the context of digital libraries, and Markwell and Brooks [26, 27] in the context of biology education. However using the proportion of dead links as a decay signal presents two problems.

(1) The first problem—determining whether a link is "dead"—is not trivial. According to the HTTP protocol [17] when a request is made to a server for a page that is no longer available, the server is supposed to return an error code, usually the HTTP return code 404. As discussed in the following sections, in fact many servers, including most reputable ones, do not return a 404 code—instead the servers return a substitute page and an OK code (200). The substitute page sometimes gives a written error indication, sometimes returns a redirect to the original domain home page, and sometimes returns a page which has absolutely nothing to do with the original page. Studies show that these type of substitutions, called "soft-404s," account for more than 25% of the dead links. This issue is discussed in detail and a heuristic is proposed for the detection of servers that engage in soft 404s. The heuristic is effective for all cases except for one special case: a dead domain home page bought by a new entity and/or "parked" with a broker of domain names: in this special case it can be determined that the server engages in soft 404 in general but there is no way to know whether the domain home page is a soft 404 or not.

(2) The second problem associated with dead links as a decay signal is that they are very noisy signals. One reason is because it is easy to manipulate. Indeed, many commercial sites use content management systems and quality check systems that automatically remove any link that results in a 404 code. For example, experiments indicate that the YAHOO! taxonomy is continuously purged of any dead links. However, this is hardly an indication that every piece of the YAHOO! taxonomy is up-to-date. YAHOO! is a search portal.

Another reason for the noisiness is that pages of certain types tend to live "forever" even though no one maintains them: a typical example might be graduate students pages—many universities allow alumni to keep their pages and e-mail addresses indefinitely as long as they do not waste too much space. Because these pages link among themselves at a relatively high rate, they will have few dead links on every page, even long after the alumni have left the ivory towers; it is only as a larger radius is examined around these pages that a surfeit of dead links is observed.

The discussion above suggests that the measure of the decay of page p should depend not only on the proportion of dead pages at distance 1 from p but also, and to a decreasing extent, on the proportion of dead pages at distance 2, 3, and so on.

One way to estimate these proportions is via a random walk from p: at every step if a dead page is reached failure is declared, otherwise with probability $\sigma$ success is declared, and with probability $1-\sigma$ the walk continues. The decay score of p, denoted D(p) is defined as the probability of failure in this walk. Thus the decay score of a page p will be some number between 0 and 1.

At first glance, this process is similar to the famous random surfer of PAGERANK [7] (PAGERANK is an algorithm that organizes information based on perceived importance or relevance); however, they are quite different in practice: for PAGERANK the importance of a page p depends recursively on the importance of the pages that point top. In contrast the decay of p depends recursively on the decay of the pages that are linked from p. Thus, computing the underlying recurrence once the web graph is fully explored and represented is very similar, but 1. The decay of a given page can be approximated in isolation, that is, without having to compute the decay of all pages in the graph, hence it is a much easier task when the number of nodes of interest is relatively small.
2. While the owner of a page p has few licit means of improving its PAGERANK, it can easily reduce its decay by simply making sure that all the links on page p go to well maintained pages.

It is generally agreed that PAGERANK is a better signal for the quality of a page than simply its in-degree (i.e., the number of pages that point to it) and recent studies [29, 10] have shown that the in-degree has only limited correlation with PAGERANK. Similar questions can be asked about the decay number versus the dead links proportion: experiments indicate that their correlation is only limited and indeed the decay number is a better indicator. For instance, on average, the set of 30 pages that analyzed from the YAHOO! taxonomy have almost no dead links, but have relatively high decay, roughly the median value observable on the Web. This seem to indicate that YAHOO! has a filter that drops dead links immediately, but on the other hand the editors that maintain YAHOO! do not have the resources to check very often whether a page once listed continues to be as good as it was.

A dead web page is a page that is not publicly available over the web. A page can be dead for any of the following reasons: (1) its URL is malformed; (2) its host is down or non-existent; or (3) it does not exist on the host. The first two types of dead pages are easy to detect: the former fails URL parsing and the latter fails the resolution of the host address. When fetching pages that are not found on a host, the web server of the host is supposed to return an error; typically the error message returned is the 404 HTTP return code. However, it turns out that many web servers today do not return an error code even when they receive HTTP requests for non-existent pages. Instead, they return an OK code (200) and some substitute page; typically, this substitute is an error message page or the home-page of that host or even some completely unrelated page. Such non-existent pages that cause a server to issue the foregoing result are called "soft-404 pages".

Figure 4:
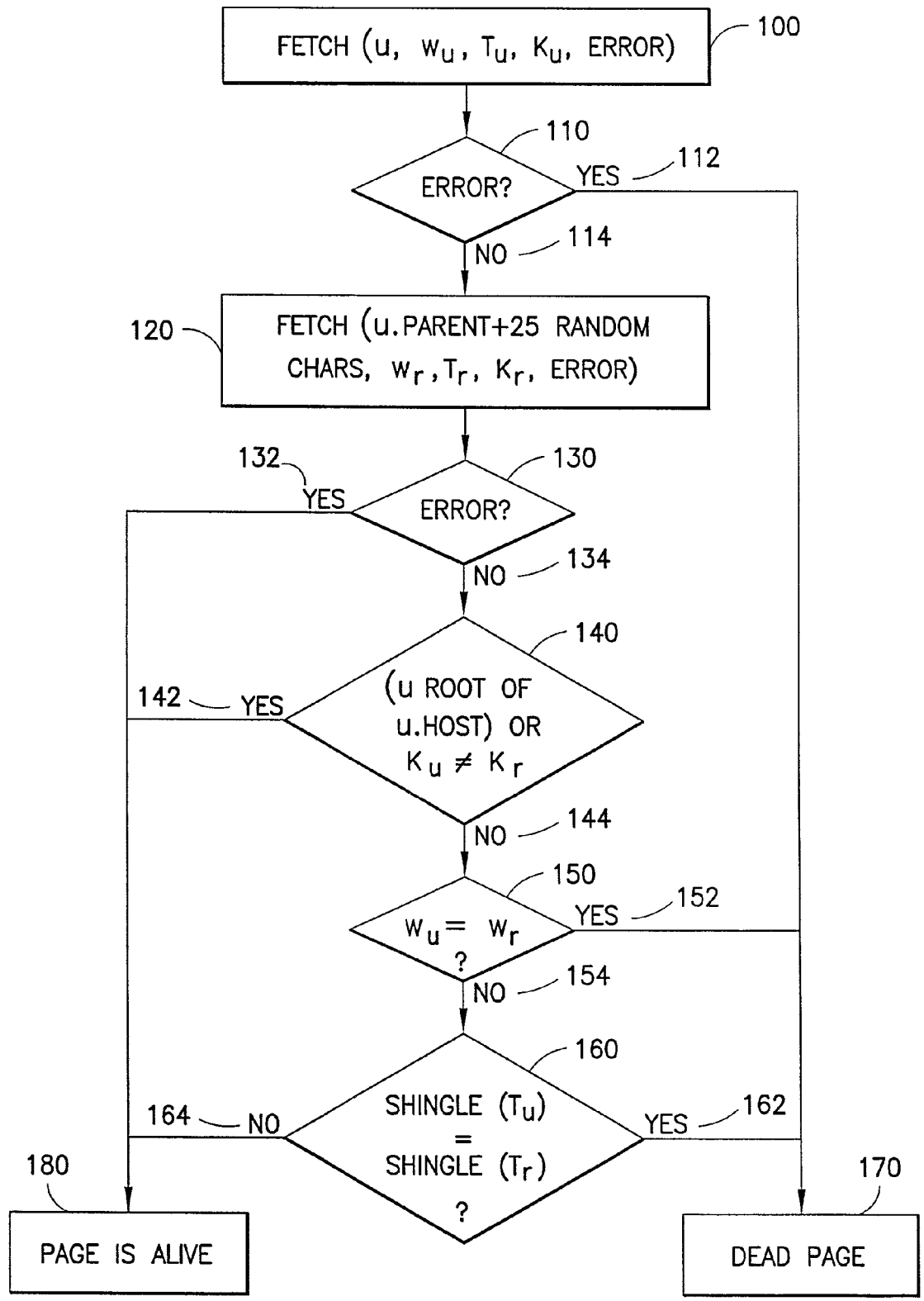
FIG. 4 is a flowchart depicting the steps of a method operating in accordance with one embodiment of the present invention.

The existence of soft-404 pages makes the task of identifying dead pages non-trivial. Next to be described will be an algorithm for this task operating in accordance with one embodiment of the present invention. The pseudo code for the task is reproduced in Appendix A, and a flowchart depicting the steps of the method is shown in FIG. 4. For the rest of the discussion, a web page will be identified with its URL, and the two concepts will be used interchangeably.

A soft-404 page is a non-existent page that does not result in the return of an error code. This is because the server to which the web page request was directed is programmed to issue an alternate page whenever a 404 error message would ordinarily be issued. In contrast, a hard 404 page is a non-existent page that returns an error code of 403, 404 or 410, or any error code of the form 5xx. Dead pages consist of soft-404 pages, hard-404 pages, and a few more cases such as time-outs and infinite redirects discussed below.

Let u be the URL of a page, to be tested whether dead or alive. Let u.host denote the host of u, and let u.parent denote the URL of the parent directory of u. For example, both the host and the parent directory URL of www.ibm.com/us are www.ibm.com; however the parent directory of www.ibm.com/us/hr is www.ibm.com/us. u.host and u.parent can be extracted from u by proper parsing.

An algorithm operating in accordance with aspects of methods and apparatus of the present invention starts by attempting to fetch u from the web (Line 3 of the function DeadPage). A fetch (step 100 in FIG. 4; see function atomicFetch) may result in one of the following three outcomes: (1) it succeeds, (2) it fails, or (3) it redirects to a different URL v. The possible reasons for failure are: (a) u is an invalid URL and could not be properly parsed (lines 2-3 of atomicFetch); (b) the local DNS server could not resolve the IP address of u.HOST (lines 6-7 of atomicFetch); (c) when creating a connection to u.HOST, there was no response within T seconds (in experiments T=10 was chosen) (Lines 10-11 of atomicFetch); or (d) the web server of u.HOST returns an error HTTP return code in response to the request for u (Lines 12-13 of atomicFetch). The HTTP return codes which are considered to be errors are 403 (Forbidden), 404 (Not found), 410 (Gone), and all the codes of the form 5xx (Server errors). If a return code in these classes is returned, the algorithm concludes that the page does not exist at 112 in FIG. 4. A success is a HTTP return code in the 2xx series or 4xx series (except for 403, 404, 410), and a redirect is indicated by an HTTP return code in the 3xx series.

Clearly when the fetch fails, the page is dead. Next to be discussed is how to analyze the two other cases (success or redirect). The redirect case is also rather simple. An algorithm operating in accordance with the present invention attempts to fetch u. If it redirects to a new URL v, it then attempts to fetch v. It continues to follow the redirects, until reaching some URL $w_u$, whose fetch results in a success or a failure (see the function fetch). (A third possibility is that the algorithm detects a loop in the redirect path (Lines 12-13 of fetch) or that the number of redirects exceeds some limit L, which is chosen to be 20 (Lines 14-15 of fetch); in such a case the algorithm declares u to be a dead page, and stops). If the fetch of $w_u$ results in a failure, u is declared a dead page as before. If the fetch results in a success (step 114 in FIG. 4), the algorithm proceeds to checking whether u is a soft-404 page.

The algorithm detects whether u is a soft-404 page or not by "learning" whether the web server of u.HOST produces soft-404s at all. This is done by asking for a page r, known with high probability not to exist on u.HOST at step 120 in FIG. 4. It then compares the server behavior when asked for r, with its behavior when asked for u.

The first question to be addressed is how to come up with a page r that is likely not to exist on u.HOST with a high probability. This is done as follows: first, a URL is chosen, which has the same directory as u, and whose file name is a sequence of R random letters (in experiments R=25 was chosen; see Line 5 of DeadPage and step 120 of FIG. 4). The URL r is simply the concatenation of the URL u.PARENT with the random sequence. Since the file name is chosen at random, the probability that it exists under that directory is at most $N/26^R$, where N is the number of files that do exist under the directory. For any reasonable value of N, this probability is tiny, and thus it can be safely assumed that the random page r does not exist.

The reason to choose r to be in the same directory as u (and not as a random page under u.HOST) is that in large hosts different directories are controlled by different web servers, and therefore may exhibit different responses to requests for non-existent pages. An example is the host www.ibm.com. When trying to fetch a non-existent page www.ibm.com/blablabla, the result is a 404 code. However, a fetch of www.ibm.com/us/blablabla returns the home-page www.ibm.com/us. Thus www.ibm.com/us/blablabla is a soft-404 page, but www.ibm.com/blablabla is a hard-404 page.

Next it is necessary to compare the behavior of the web server on r with its behavior on u. Let $w_r$ and $w_u$ denote the final URLs reached when following redirects from r and u, respectively. Let $T_r$ and $T_u$ denote the contents of $w_r$ and $w_u$, respectively. Let $K_r$ and $K_u$ denote the number of redirects the algorithm had to follow to reach $w_r$ and $w_u$, respectively.

If the fetch of $w_r$ results in a failure, it is concluded at step 132 in FIG. 4 that the web server does not produce soft-404 pages. Since the fetch of $w_u$ succeeded, the algorithm can safely declare u as alive (Lines 7-8 in DeadPage). Suppose, then, that the fetch of $w_r$ results in a success. Thus, r is a soft-404 page.

If $w_r = w_u$ and $K_r = K_u$, then u and r are indistinguishable. This gives a clear indication that u is a soft-404 page except for one special case: there are situations when soft-404 pages and legitimate URLs both redirect to the same final destination (for example, to the host's home-page). A good example of that is the URL www.cnn.de (the CNN of Germany), which redirects to www.n-tv.de; however, also a non-existent page like www.cnn.de/blablabla redirects to www.n-tv.de. Thus the following heuristic is used: if u is a root of a web site, then it can never be a soft-404 page (step 140 of FIG. 4 and Lines 9-10 of DeadPage; see discussion below about when this heuristic may fail). Otherwise at step 150, if $w_r = w_u$ and $K_r = K_u$, then u is declared a soft-404 page (Step 152 of FIG. 4; Lines 13-14 of DeadPage).

If $K_r \neq K_u$ (step 142 in FIG. 4) the algorithm declares u to be alive (step 180) (even if $w_r = w_u$), because the behavior of the web server on u is different from its behavior on r (Lines 11-12 of DeadPage). An example that demonstrates that the number of redirects is crucial for the test is www.eurosport.de/. Fetching www.eurosport.de/ incurs two redirects that finally land in a valid page. However, fetching www.eurosport.de/blablabla redirects first to www.eurosport.de/ and then results in two more redirects as before. Thus, both the valid page and the soft-404 page end up at the same valid page, but the former requires two redirects while the latter requires three.

Even if $w_r \neq w_u$ (step 152 in FIG. 4) it is still possible that u is a soft-404 page, because in some hosts each soft-404 page is redirected into a unique address (www.amazon.com, for example). Thus, the contents of $w_r$ and $w_u$, and the parameters $K_r$ and $K_u$ are next examined at step 160. If $w_r \neq w_u$, $K_r = K_u$, and $T_u$ and $T_r$ are identical or nearly-identical (near-identity can be checked via shingling [8]), the algorithm declares u to be a soft-404 page (step 162; Lines 15-16 of DeadPage). If not, the page is declared to be alive at step 164. Note that testing near-identity (as opposed to complete identity) may be important; because sometime the web server embeds the non-existing URL u in the text of the page it returns or does other minor changes.

Figure 5:
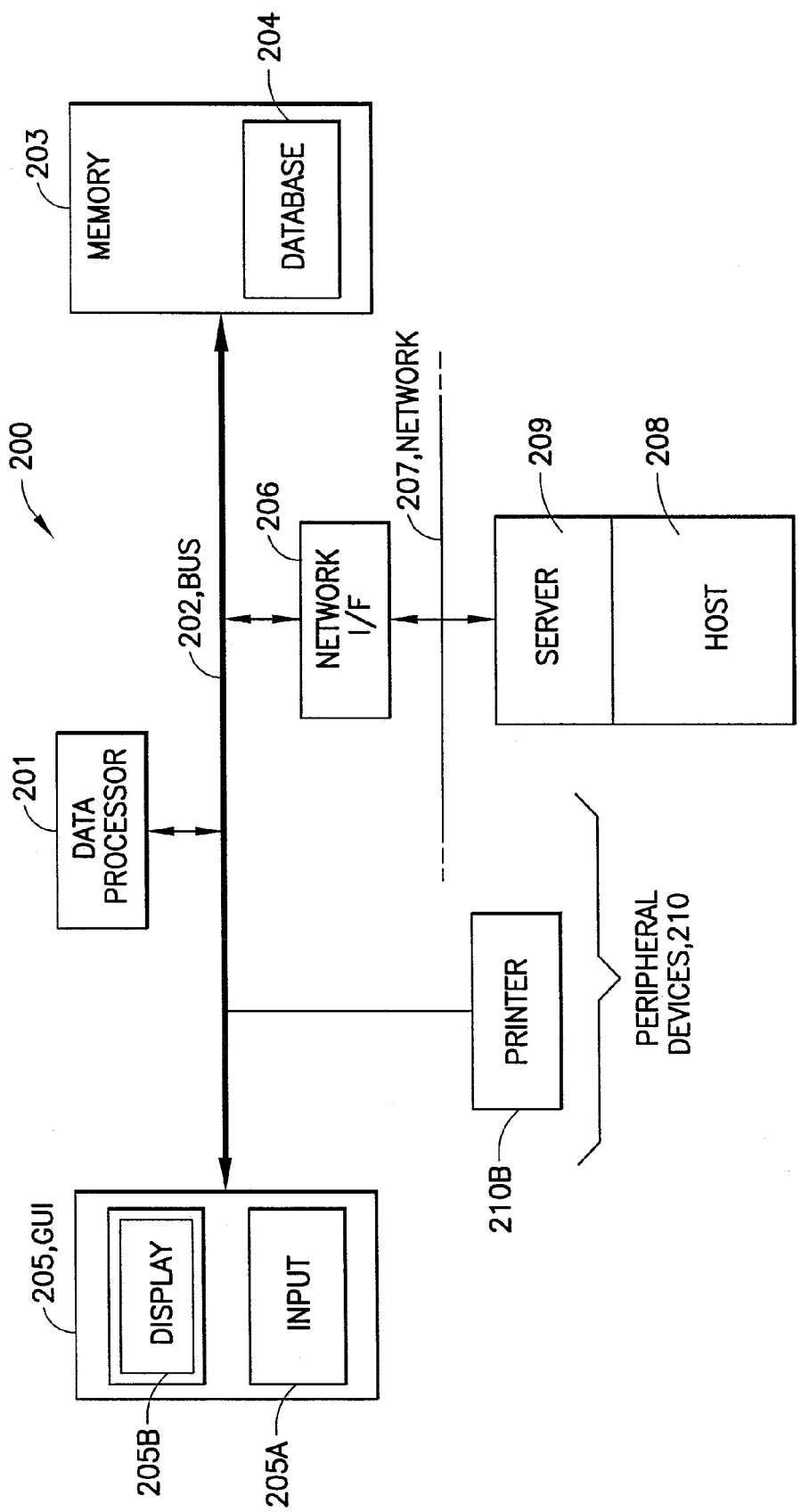
FIG. 5 depicts a block diagram of a computer system suitable for practicing the methods and apparatus of the present invention.

A computer system for practicing the methods of the present invention is depicted in simplified form in FIG. 5. The data processing system 200 includes at least one data processor 201 coupled to a bus 202 through which the data processor may address a memory sub-system 203, also referred to herein simply as "memory" 203. The memory 203 may include RAM, ROM and fixed and removable disks and/or tape. The memory 203 is assumed to store at least one program comprising instructions for causing the processor 201 to execute methods in accordance with the present invention. Also stored in memory 203 is at least one database 204.

The data processor 201 is also coupled through the bus 202 to a user interface, preferably a graphical user interface ("GUI") 205 that includes a user input device 205A, such as one or more of a keyboard, a mouse, a trackball, a voice recognition interface, as well as a user display device 205B, such as a high resolution graphical CRT display terminal, a LCD display terminal, or any suitable display device. With these input/output devices, a user can initiate operations to determine the currency or staleness of a web page.

The data processor 201 may also be coupled through the bus 202 to a network interface 206 that provides bidirectional access to a data communications network 207, such as an intranet and/or the internet. In various embodiments of the present invention, a host 208 containing web pages to be tested can be accessed over the internet through server 209.

In general, these teachings may be implemented using at least one software program running on a personal computer, a server, a microcomputer, a mainframe computer, a portable computer, an embedded computer, or by any suitable type of programmable data processor 201. Further, a program of machine-readable instructions capable of performing operations in accordance with the present invention may be tangibly embodied in a signal-bearing medium, such as, a CD-ROM.

The above scheme is doing its best to capture as many of the cases of soft-404 pages as possible. There are other instances of soft-404 errors that need to be detected, for example, when the root of a web page is, in fact, a soft-404 page. An emerging phenomenon on the web is the one of "parked web sites". These are dead sites whose address was re-registered to a third party. The third party puts a redirect from those dead sites into his own web site. The idea is to profit from the prior promotional works of the previous owners of the dead sites. A report by Edelman [15] gives a nice description of this phenomenon as well as a case study of a specific example.

Let n be the total number of pages. Let $D \subset [n]$ be the set of all dead pages, and let all other pages be live. Let M be the $n \times n$ matrix of the multi-graph of links among pages, so that $M_{ij}$ is the number of links on page i to page j. To begin, one modification is performed on the matrix: $M \leftarrow M+I$, adding a self loop to each page. A measure $D_\sigma(i)$ will be defined in terms of a "success parameter" $\sigma \in [0, 1]$. (In experiments, $\sigma = 0.1$ is selected).

First, decay is described as a random process. Next, it is given a formal recursive definition, and finally, it is cast as a random walk in a Markov chain.

Figure 6:
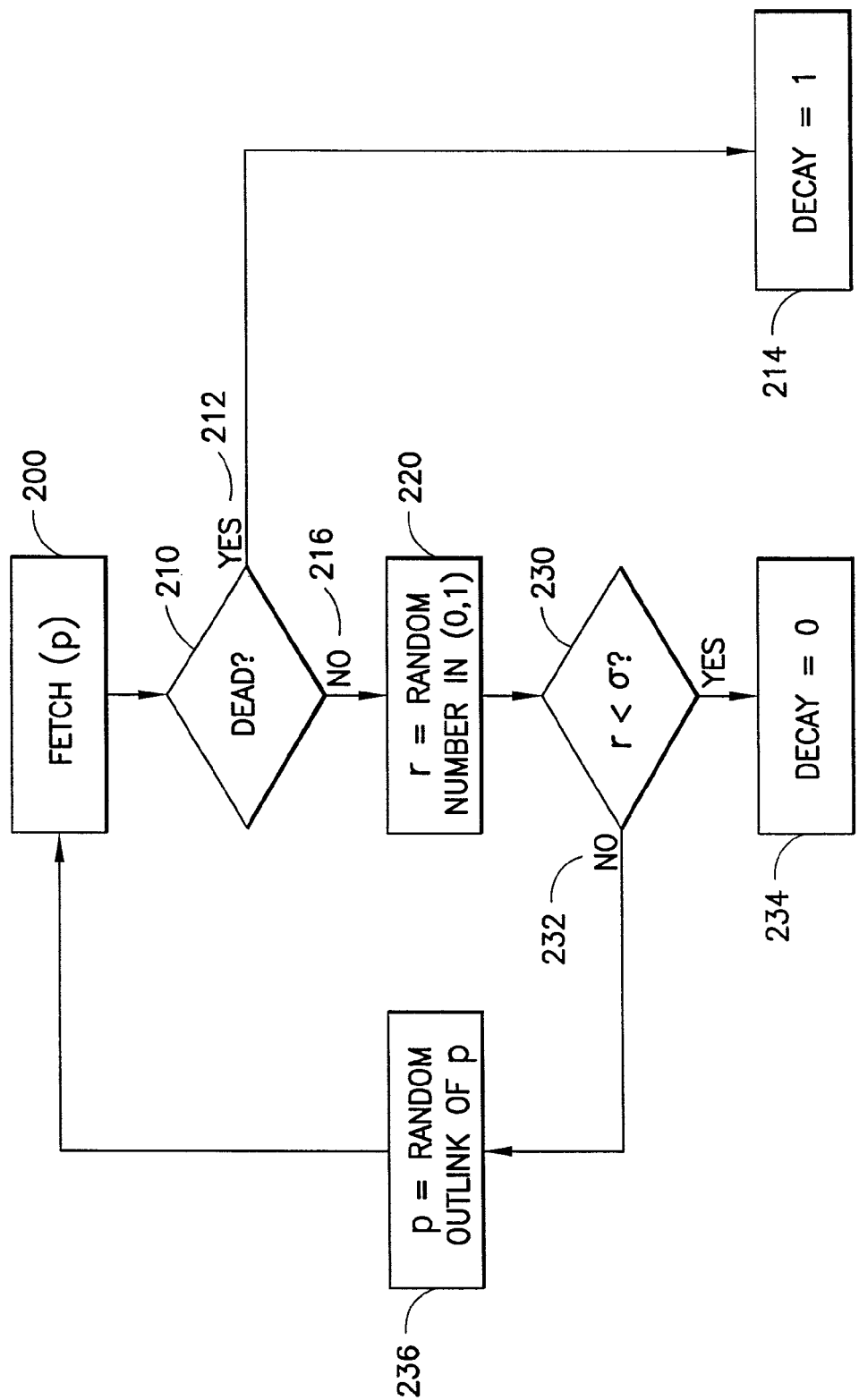
FIG. 6 is a flowchart depicting the steps of a method operating in accordance with an embodiment of the present invention.

The measure can be seen as a random process governing a "web surfer" as follows. Initially, the current page p is set to i, the page whose decay is being computed (step 200 in FIG. 6). The surfer at the current page will perform the following steps, eventually returning a binary decay score depending on the random choices made during execution of the steps; the process therefore defines a distribution over $\{0, 1\}$. The decay $D_\sigma(i)$ is the mean of this distribution.

1. If $p \in D$, the surfer terminates with decay value 1: the page is completely decayed (Steps 212 and 214 in FIG. 6).
2. Otherwise the result is "no" (Step 216 in FIG. 6), and the surfer flips a biased coin at step 220, and with probability $\sigma$ decides that the content of the current page meets his information need (Step 230 in FIG. 6), and hence terminates successfully with decay score 0 (Step 234 in FIG. 6).
3. With the remaining probability $1-\sigma$, the surfer chooses an outlink of p uniformly at random (Step 236 in FIG. 6), sets p to be the destination of that outlink, and begins the again from step 200.

Unrolling this definition a few steps, it becomes clear that the decay of a page is influenced by dead pages a few steps away, but that the influence of a single path decreases exponentially with the length of the path. For example a dead page has decay 1, a live page whose outlinks are all dead has decay $1-\sigma$, a live page whose all outlinks point to live pages that in turn point only to dead pages has decay $(1-\sigma)^2$, etc.

Now, a formal definition of the decay measure is given. Recursively, $D_\sigma(i)$ is defined as follows:

$$D_\sigma(i) = \begin{cases} 1 & i \in D, \\ (1-\sigma)\left(\dfrac{\sum_{j\in[n]} M_{ij} D_\sigma(j)}{\sum_{j\in[n]} M_{ij}}\right) & \text{otherwise.} \end{cases}$$

Understanding the solution to this recursive formulation is easiest in the context of random walks, as described below.

Decay scores may also be viewed as absorption probabilities in a random walk. A Markov chain in which this walk takes place is now defined. First, the incidence matrix of the web graph must be normalized to be row stochastic (each nonzero element is divided by its row sum). Next, two new states must be added to the chain, each of which has a single outlink to itself: n+1 is the success state, and n+2 is the failure state. Thus these two new states are absorbing. Finally, the following two modifications are made to the matrix: first, each dead state is modified to have a single outlink with probability 1 to the failure state; second, all edges from non-dead states ($[n] \setminus D$) are multiplied by $1-\sigma$ in probability, and a new edge with probability $\sigma$ is added to the success state. Hence the two new states are the only two absorbing states of the chain, and any random walk in this chain will be eventually absorbed in one of the two states. Walks in this new chain mirror the random process described above, and the decay of page i is the probability of absorption in the failure state when starting from state i.

Global static ranking measures such as PAGERANK [7] usually have to be computed globally for the entire graph during a lengthy batch process. Other graph oriented measures such as HITS [21] may be computed on-the-fly, but require inlink information typically derived from a complete representation of the web graph, such as [4], or from a large scale search engine that makes available information about the inlinks of a page.

Decay, on the other hand, is defined purely in terms of the out-neighbors of i. The following observations can be made:

OBSERVATION 1. The decay value of a page can be approximated to within constant accuracy in a constant number of HTTP fetches, independent of the link structure of the graph, without access to any other supporting indexes.

Such an implementation mirrors the random process definition of decay set forth previously. Because the walk terminates with probability at least $\sigma$ at each step, the distribution over number of steps is bounded above by the geometric distribution with parameter $\sigma$; thus, the expected number of steps for a single trial is no more than $1/\sigma$, and the probability of long trials is exponentially small. Further, the value of each trial is 0 or 1, and so decay can be estimated to within error $\epsilon$ with probability $1-\delta$ in $O(1/\epsilon^2 \log 1/\delta)$ steps; this follows from standard Chernoff bounds. (In practice, 300 trials are employed to estimate the decay value of each page).

Figure 7:
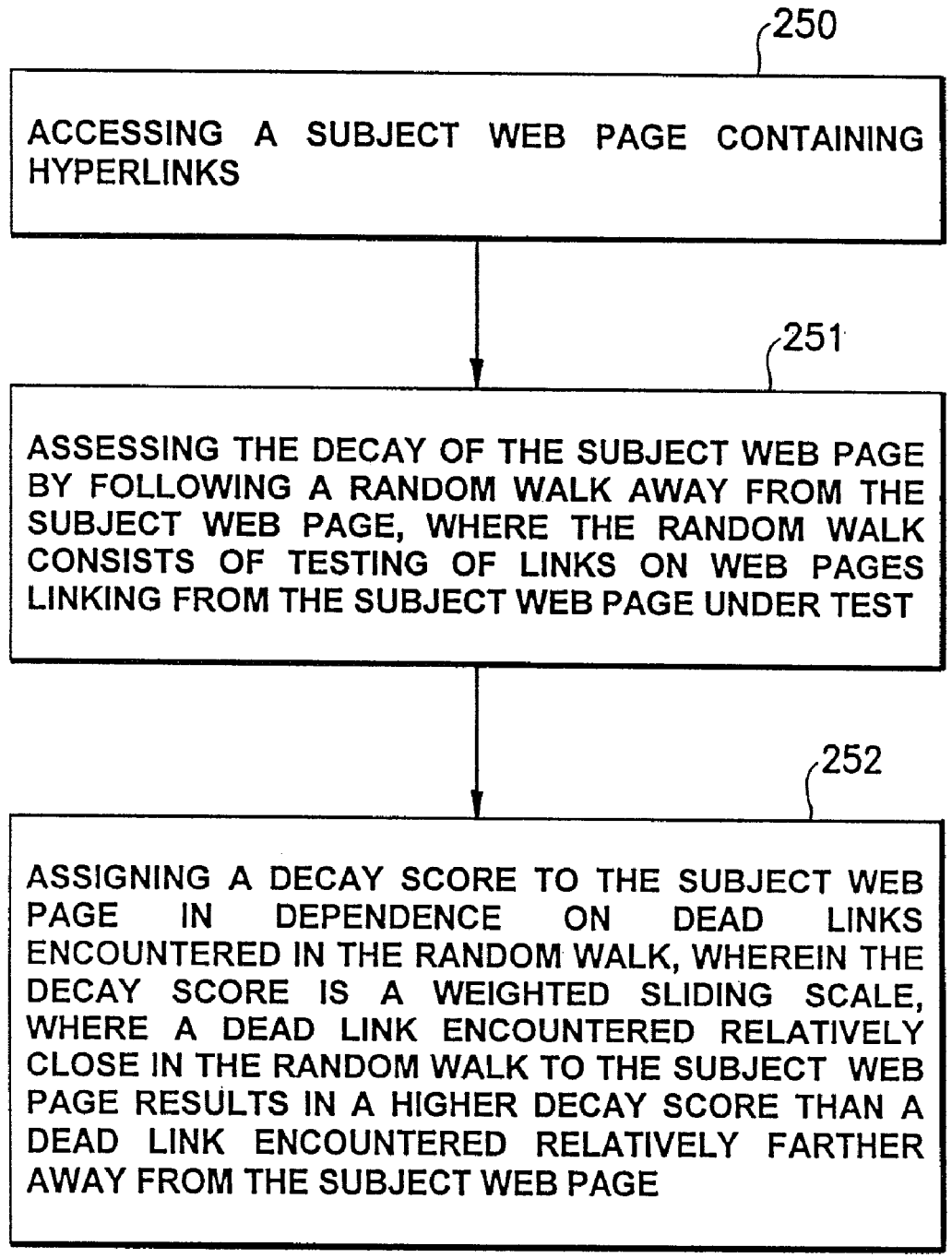
FIG. 7 is a flowchart depicting the steps of a method operating in accordance with an embodiment of the present invention.

An alternative method operating in accordance with the present invention for assessing the decay of a web page is depicted in FIG. 7. At step 250, a subject web page containing hyperlinks is accessed over the internet. Then at step 251, the decay of the subject web page is assessed by following a random walk away from the subject web page, where the random walk consists of testing of links on web pages linking from the subject web page under test. In variants of this embodiment, the links being tested may be on web pages directly linked to the subject web page whose decay status is being tested, or may be on web pages linked to the subject web page by an arbitrary number of intermediate web pages and hyperlinks. Then at step 252, a decay score is assigned to the subject web page in dependence on dead links encountered in the random walk, wherein the decay score is a weighted sliding scale, where a dead link encountered relatively close in the random walk to the subject web page results in a higher decay score than a dead link encountered relatively farther away from the subject web page.

Like other measures, decay is also amenable to the more traditional batch computation; it is expected to require a time similar to the time required by PAGERANK.

Next, the algorithm for identifying dead pages and the random walk algorithm for estimating the decay score of a given page was implemented. Then several sets of experiments described below were run. The first set of experiments validated that the decay measure set forth previously is a reasonable measure for the decay of web pages. Next, it was compared to another plausible measure, namely, the fraction of dead links on a page. After establishing that the present decay measure is reasonable, it was used to discover interesting facts about the web.

In this section the settings of parameters for two algorithms that were used in the experiments are described. The parameters of the algorithm for detecting dead pages were set as follows:

A timeout of T=10 seconds was allowed for fetching a page. If the server does not respond within 10 seconds, the page is declared dead.

At most L=20 redirects for a page are allowed. If more than 20 redirects are encountered, the page was declared dead.

To create a random URL in the same directory of the page, the parent directory is appended with a sequence of 25 random lower case Latin letters.

The parameters of the random walk algorithm were set as follows:

In general, a success parameter $\sigma$=0.1 is used. Thus, at each step of the random walk, with probability 0.1, the random walk proceeds to the success absorbing state. The expected length of a random walk is then at most 10.

For each page, the random walk algorithm is run 300 times. This guarantees an additive error in the decay measure estimates of at most 0.1 with confidence at least 0.8.

On average, getting the decay score of a page took about 7 minutes on a machine with double 1.6 GHz AMD processors, 3 GB of main memory, running a Linux operating system and having a 100 Mbps connection to the network. Since the task was highly parallelizable (the decay score of different pages could be estimated in parallel, and also different random walks for the same page could be run in parallel), about 10 random walk processes were run simultaneously, in order to increase throughput.

The first experiment involved computing the decay score and the fraction of dead links on 1000 randomly chosen pages. The pages were chosen from a two billion page crawl performed largely in the last four months.

To begin with, of the 1000 pages, 475 were already dead (substantiating the claim that web pages have short half lives, on average). For each remaining page, its decay score was computed as well as the fraction of its dead links. In total, there were 710 dead links on the pages and out of these, 207 were pointing to soft-404 pages (roughly 29%). Moreover, the random walks during the decay score computation of the 525 pages encountered a total of 22,504 dead links, out of which 6,060 pointed to soft-404 pages (roughly 27%). Another interesting statistic is that only 350 of the 525 pages alive had a non-empty "Last Modified Date".

The main statistic emerging out of this experiment is that the average fraction of dead links is 0.068 whereas the average decay scores of a live page with at least one outlink are 0.168, 0.106, 0.072, and 0.041 for values of $\sigma$=0.1, 0.2, 0.33 and 0.5, respectively.

Figure 8:
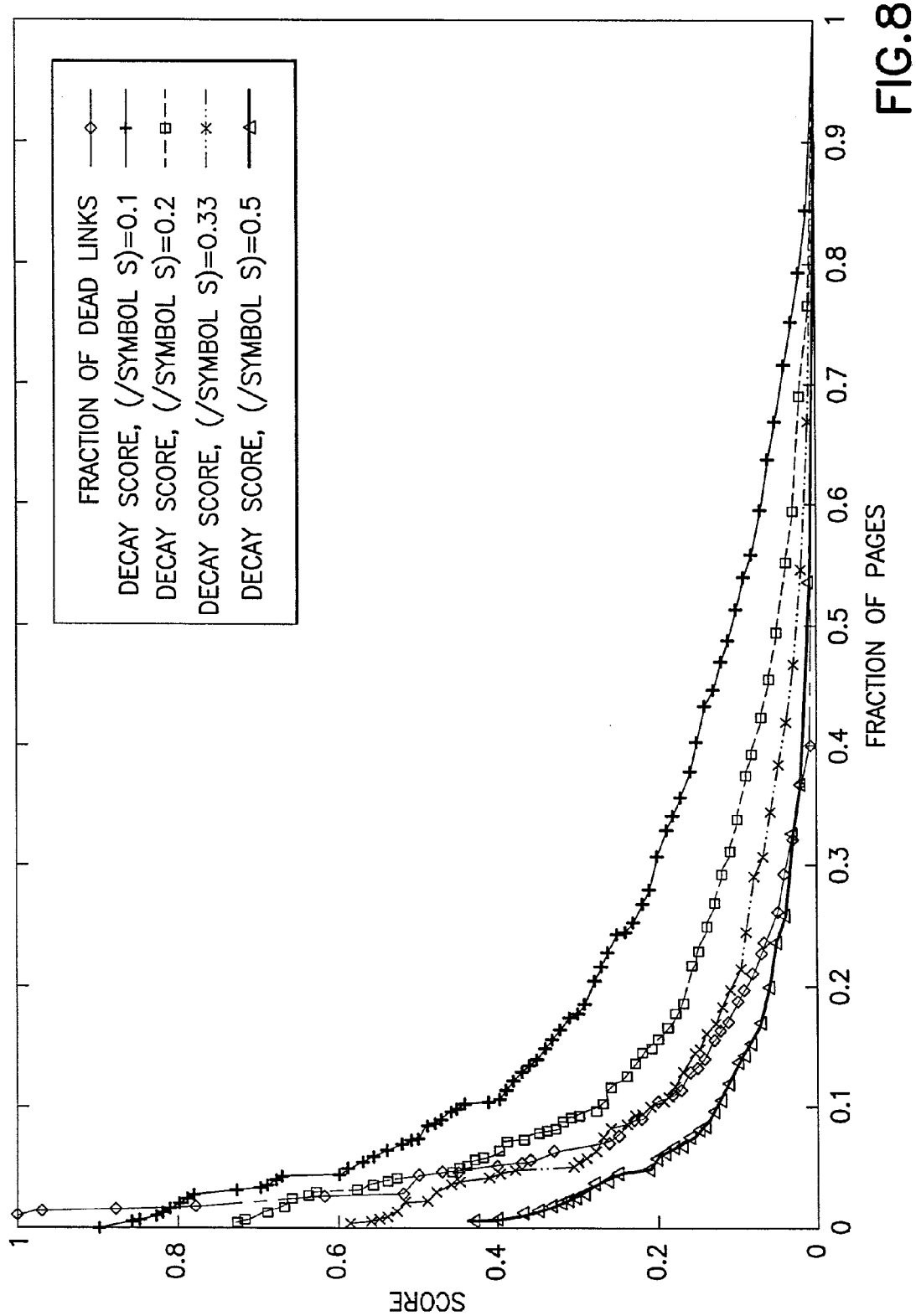
FIG. 8 is a graph depicting the distribution of the fraction of dead links and decay scores for various $\sigma$'s.

The decay curves in FIG. 8 reflect the fact that for a given page i if $\sigma_1 \geq \sigma_2$, then $$D_{\sigma 1}(i) \leq D_{\sigma 2}(i).$$

Proof: The decay is the probability of absorption into the failure state. Consider all paths that lead to the failure state. Then the weight of each individual path under $\sigma_1$ is less or equal to its weight under $\sigma_2$; namely for a path of length k it is $(1-\sigma_i)^k$ times the unbiased random walk weight of the path. (The same argument does not work for the paths that lead to the success state; their individual weight is not monotonic in $\sigma$.)

For the rest of the description, $\sigma$=0.1 is used.

Clearly the decay and the fraction of dead links are related but not in a simple way. More precisely, if F(i) is the fraction of dead links on page i, and page i is not dead then $$\mathcal{D}_\sigma(i) = (1-\sigma)(\mathcal{F}(i) + (1-\mathcal{F}(i))\overline{\mathcal{D}}(i))$$

where $\overline{\mathcal{D}}(i)$ is the average decay of the non-dead neighbors of i.

Figure 9:
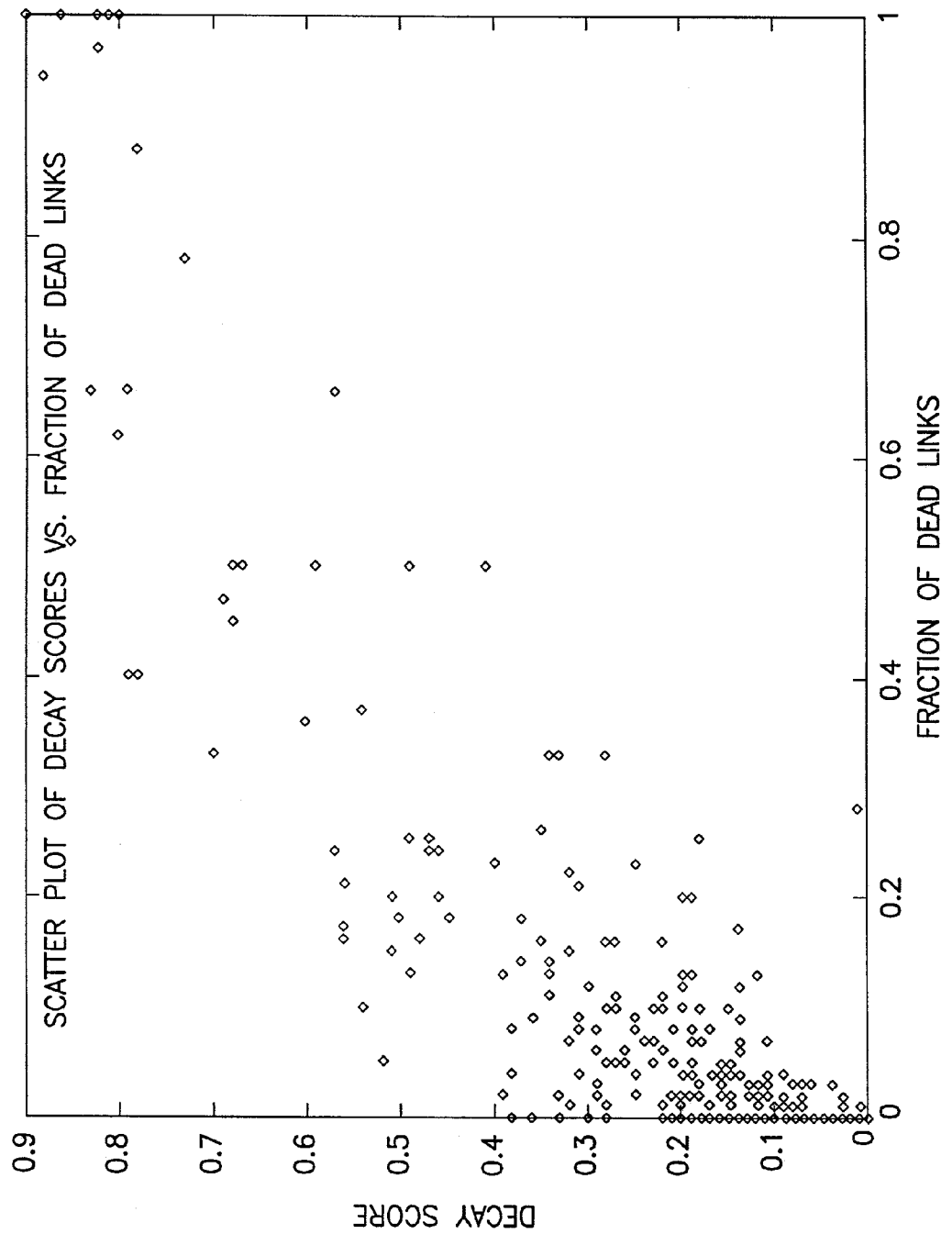
FIG. 9 is a scatter plot of decay scores versus the fraction of dead links.

FIG. 8 shows that the distributions of $\mathcal{D}$ and $\mathcal{F}$ intersect. The difference among them can also be seen from the scatter plot of these distributions for $\sigma$=0.1 (FIG. 9). The scatter plot shows that the decay score is generally more than the fraction of dead links. (This also follows from equation 1). More interestingly, it also shows that the decay measure can be close to 0.5 even when the fraction of the dead links is close to 0.

Figure 10:
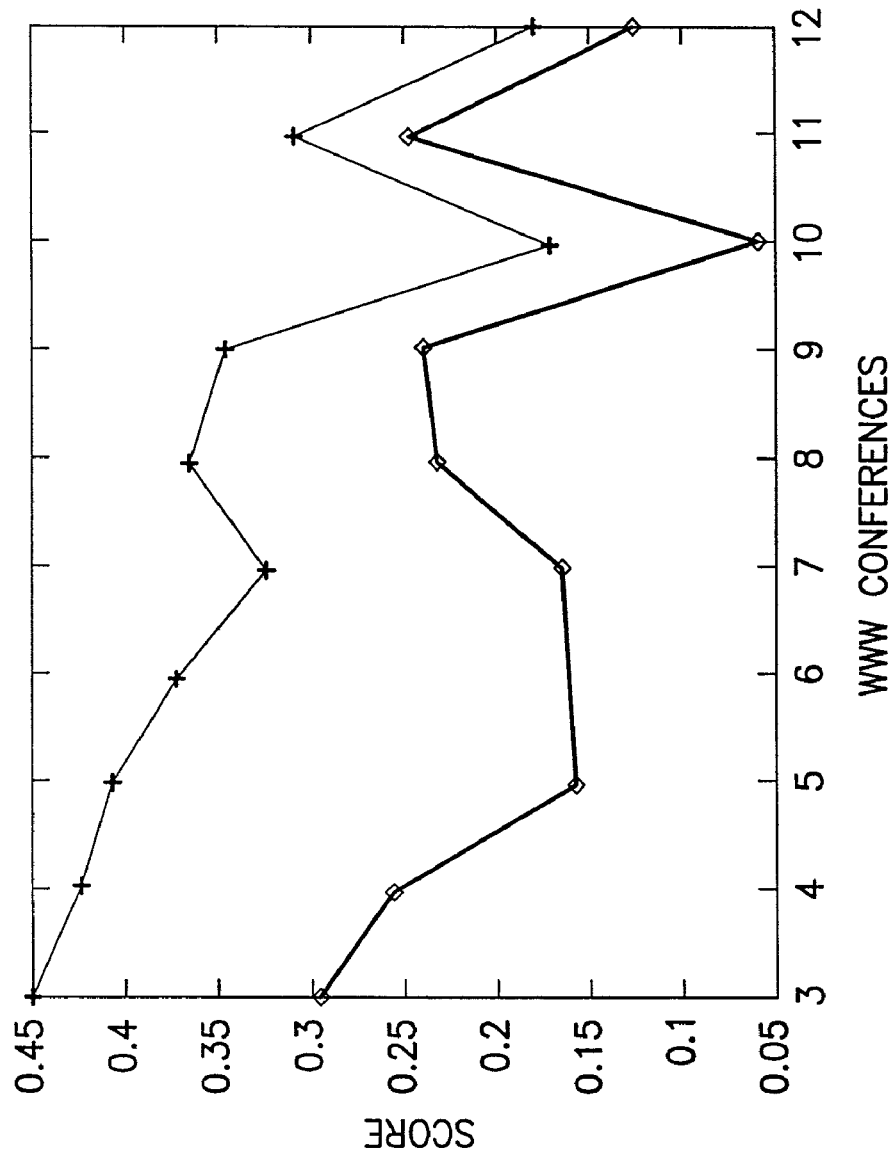
FIG. 10 is a graph depicting the average decay score and fraction of dead links for papers from the last ten WWW conferences.

The next experiments to be described concern papers from the last ten World Wide Web conferences. All of the (refereed track) papers from WWW3 to WWW12 were crawled and for each paper with at least one outlink, its decay score and the fraction of dead links was computed. The averaged results are shown in FIG. 10. The main observation is the following. It is claimed that the trend exhibited by decay scores is more representative and more useful than that of the fraction of dead links. From the figure, it is evident that the decay scores decline as conferences get more recent; on the other hand, the fraction of dead links exhibits a flatter trend. It is arguably the case that on average, links contained in papers from older conferences not only have a higher chance of themselves being dead, but also are more likely to point to pages that are dead. Decay scores are therefore able to reflect better the temporal aspect of hyperlink creation and maintenance; it is believed this feature might have other applications.

Figure 11:
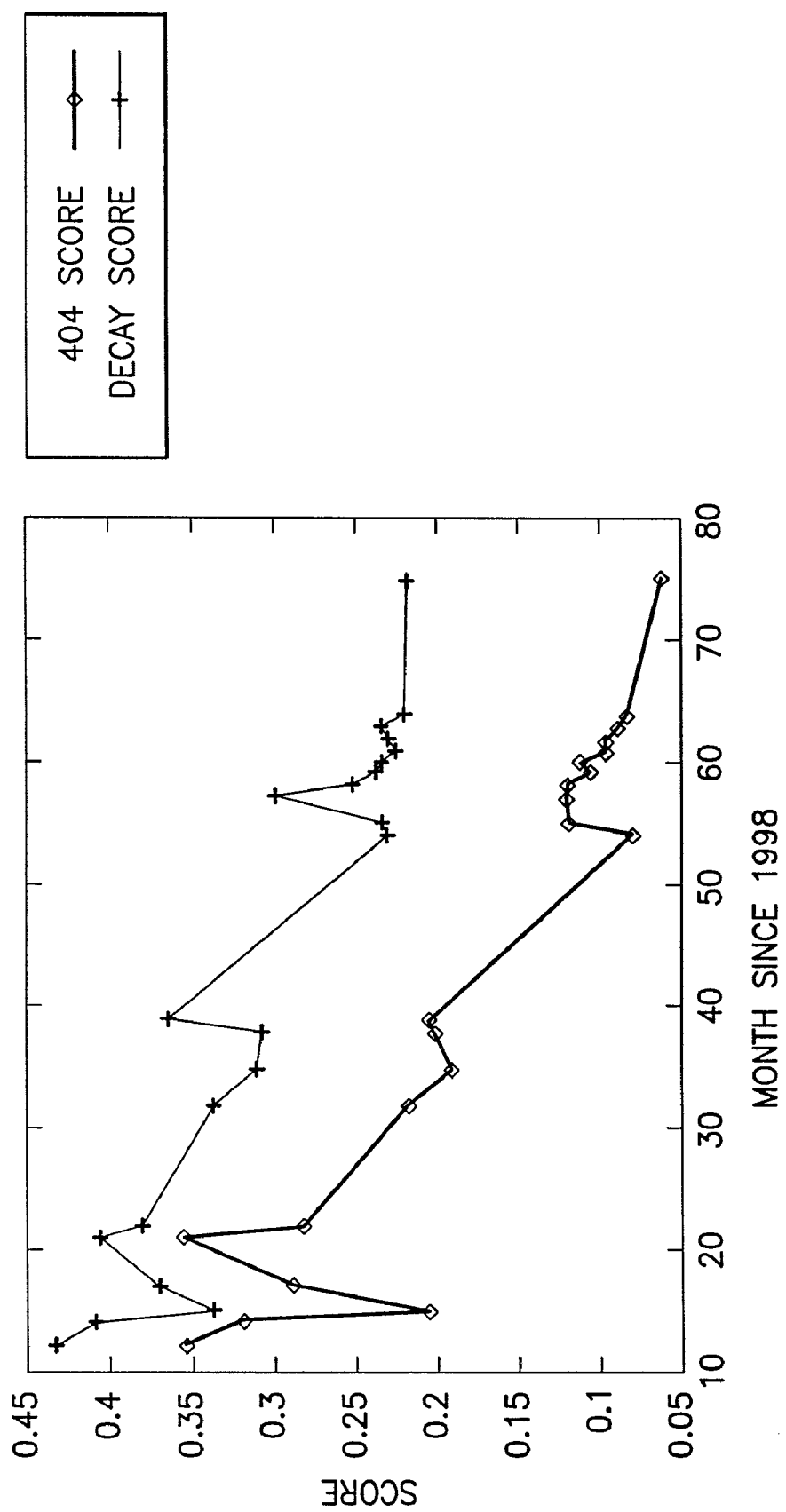
FIG. 11 depicts the average decay scores and fraction of dead links for 30 Yahoo nodes.

The next experiment performed consisted of a set of 30 nodes from the current YAHOO! ontology (Appendix B). The nodes were chosen so as to have a relatively large number of outside links and be well represented in the Internet Archive (www.archive.org). The decay score and fraction of dead links were computed for each of the 30 nodes. The Internet Archive was used to fetch the previous incarnations of the same nodes in the past five years and computed the decay scores and fraction of dead links for these "old" pages as well. Since the archived pages have time stamps embedded in the URL, at the end of this step, a history of decay scores and fraction of dead links for each leaf was obtained. These scores were averaged over the 30 nodes and the time line bucketed into months (since 1998) to obtain FIG. 11.

The behavior of decay scores and fraction of dead links are still different; but the important point is that this difference in behavior is different from that of WWW conferences as well (FIG. 10). Unlike in the WWW conference case, here, the decay score is flatter whereas the fraction of dead links is rapidly decreasing. The behavior of the dead links is as expected—the fraction of dead links is close to 0 in the current version of the YAHOO! nodes; this is obviously due to their automatic filtering of dead links. But, even in the current version of these nodes, the figure shows that the decay score of these is as high as that of a random web page (i.e., close to 0.2).

Thus, it can be concluded that many of the pages pointed by YAHOO! nodes, even though are not dead themselves yet, are littered with dead links and outdated. For example, consider the YAHOO! category Health/Nursing. Only three out of 77 links on this page are dead. However, the decay score of this page is 0.19. A few examples of dead pages that can be reached by browsing from the above YAHOO! page are: (1) the page www.geocities.com/Athens/4656/has an ECG tutorial where all the links are dead; (2) the page virtualnurse.com/er/er.html has many dead links; (3) many of the links in the menu bar of www.nursinglife.com/index. php?n=1&id=1 are dead; and so on. It is believed that using decay scores in an automatic filtering system will improve overall quality of links in a taxonomy like YAHOO!

Figure 12:
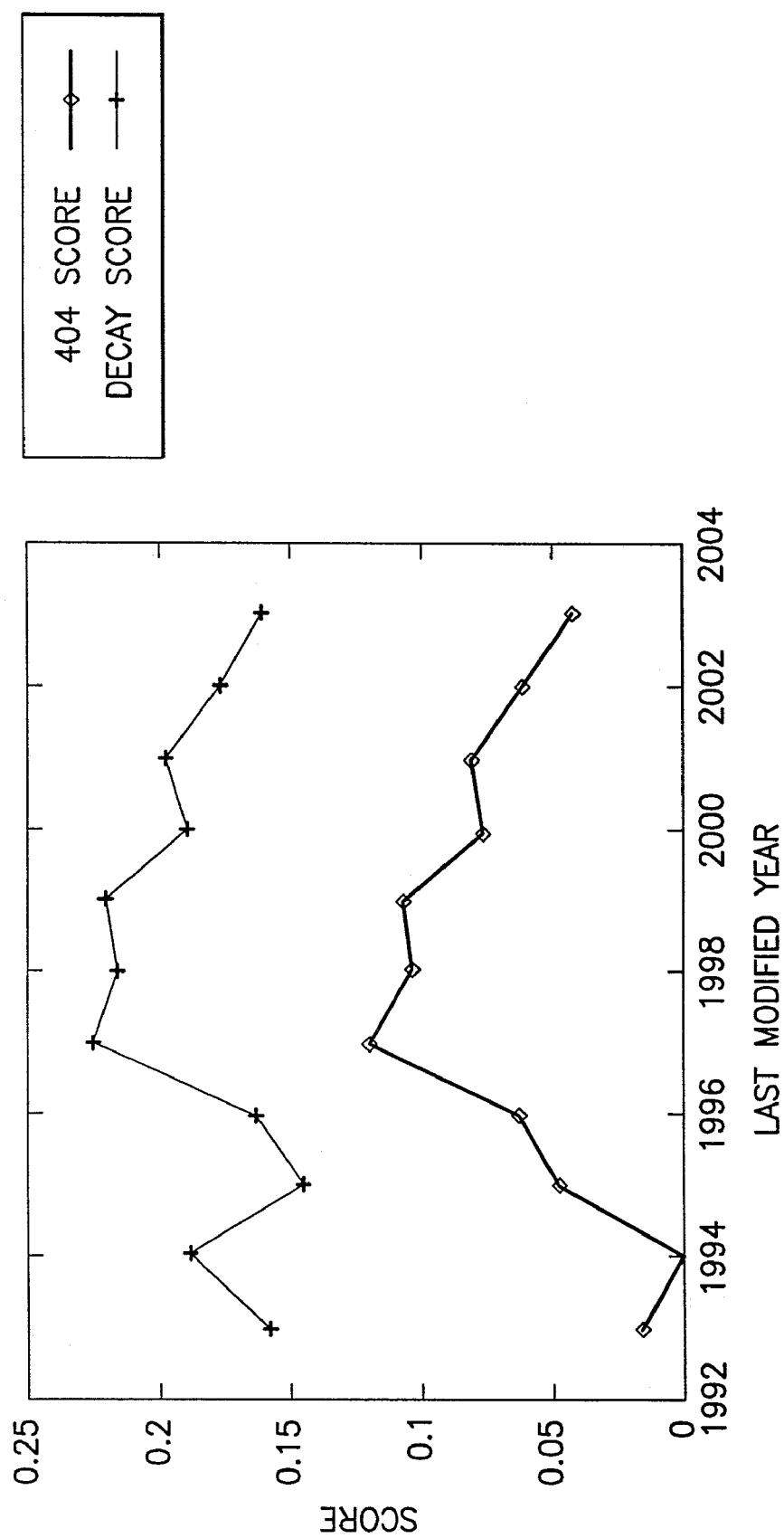
FIG. 12 depicts the average decay scores and fraction of dead links for FAQs.

The final set of experiments to be described involved the frequently asked questions (FAQs) obtained from www.faqs.org. All 3,803 FAQs were collected and decay scores and the fraction of dead links were computed for each of them. The last modified/last updated date for the FAQs was computed by explicitly parsing the FAQ (since the last modified date returned in the HTTP header from www.faqs.org does not represent the actual date when the FAQ was last modified/updated). As in the earlier case, the results were collated and the time line bucketed into years since 1992 to obtain FIG. 12.

From the figure, it is clear that despite the fact that the FAQs are hand-maintained in a distributed fashion by a number of diverse and unrelated people, it suffers from the same problem—many pages pointed to by FAQs are unmaintained.

A number of applications areas could fruitfully apply the decay concept:

(1) Webmaster and ontologist tools: There are a number of tools made available to help webmasters and ontologists track dead links on their sites; however, for web sites that maintain resources, there are no tools to help understand whether the linked-to resources are decayed. The observation about YAHOO! leaf nodes suggests that such tools might provide an automatic or semi-automatic approach to addressing the decay problem.

(2) Ranking: Decay measures have not been used in ranking, but users routinely complain about search results pointing to pages that either do not exist (dead pages), or exist but not reference valid current information (decayed pages). Incorporating the decay measure into the rank computation will alleviate this problem. Furthermore, web search engines could use the soft-404 detection algorithm to eliminate soft-404 pages from their corpus. Note that soft-404 pages indexed under their new content are still problematic since most search engines put a substantial weight on anchor text, and the anchor text to soft-404 pages is likely to be quite wrong.

(3) Crawling: The decay score can be used to guide the crawling process and the frequency of the crawl, in particular for topic sensitive crawling [12]. For instance, one can argue that it is not worthwhile to frequently crawl a portion of the web that has sufficiently decayed; as seen in the described experiments, very few pages have valid last modified dates in them. The on-the-fly random walk algorithm for computing the decay score might be too expensive to assist this decision at crawl-time but post a global crawl one can compute the decay scores of all pages on the web at the same cost as PAGERANK. Heavily decayed pages can be crawled infrequently.

(4) Web sociology and economics: Measuring decay score of a topic can give an idea of the 'trendiness' of the topic.

Thus it is seen that the foregoing description has provided by way of exemplary and non-limiting examples a full and informative description of the best methods and apparatus presently contemplated by the inventors for assessing the currency or staleness of web pages. One skilled in the art will appreciate that the various embodiments described herein can be practiced individually; in combination with one or more other embodiments described herein; or in combination with methods and apparatus differing somewhat from those described herein. Further, one skilled in the art will appreciate that the present invention can be practiced by other than the described embodiments; that these described embodiments are presented for the purposes of illustration and not of limitation; and that the present invention is therefore limited only by the claims which follow.

[1] W. Aiello, F. Chung, and L. Lu.
    A random graph model for power law graphs.
    *Experimental Mathematics*, 10:53-66, 2001.
[2] Z. Bar-Yossef, A. Berg, S. Chien, J. Fakcharoenphol, and D. Weitz.
    Approximating aggregate queries about web pages via random walks.
    In *Proceedings of the 26th International Conference on Very Large Databases*, pages 535-544, 2000.
[3] A.-L. Barabási and R. Albert.
    Emergence of scaling in random networks.
    *Science*, 286:509-512, 1999.
[4] K. Bharat, A. Broder, M. Henzinger, P. Kumar, and S. Venkatasubramanian.
    The connectivity server: Fast access to linkage information on the Web.
    In *Proceedings of the 7th International World Wide Web Conference*, pages 104-111, 1998.
[5] K. Bharat and M. Henzinger.
    Improved algorithms for topic distillation in a hyperlinked environment.
    In *Proceedings of the 21st Annual International ACM SIGIR Conference on Research and Development in Information Retrieval*, pages 104-111, 1998.
[6] B. Brewington and G. Cybenko.
    How dynamic is the web?
    In *Proceedings of the Ninth International World Wide Web Conference*, pages 257-276, May 2000.
[7] S. Brin and L. Page.
    The anatomy of a large-scale hypertextual Web search engine.
    In *Proceedings of the 7th International World Wide Web Conference*, pages 107-117, 1998.
[8] A. Z. Broder, S. C. Glassman, M. S. Manasse, and G. Zweig.
    Syntactic clustering of the Web.
    In *Proceedings of the 6th International World Wide Web Conference*, pages 391-404, 1997.
[9] A. Z. Broder, R. Kumar, F. Maghoul, P. Raghavan, S. Rajagopalan, R. Stata, A. Tomkins, and J. Wiener.
    Graph structure in the web.
    *WWW9/Computer Networks*, 33(1-6):309-320, 2000.
[10] A. Z. Broder, R. Lempel, F. Maghoul, and J. Pedersen.
    Efficient Pagerank approximation via graph aggregation.
    Manuscript.
[11] S. Chakrabarti, B. Dom, D. Gibson, R. Kumar, P. Raghavan, S. Rajagopalan, and A. Tomkins. Spectral filtering for resource discovery.
    In *Proceedings of the ACM SIGIR Workshop on Hypertext Analysis*, pages 13-21, 1998.
[12] S. Chakrabarti, M. van den Berg, and B. Dom.
    Focused crawling: a new approach to topic-specific web resource discovery.
    *WWW8/Computer Networks*, 31(11-16):1623-1640, 1999.
[13] J. Cho and H. Garcia-Molina. The evolution of the web and implications for an incremental crawler. In *Proceedings of the 26th International Conference on Very Large Databases*, pages 200-209, 2000.
[14] F. Douglis, A. Feldmann, B. Krishnamurthy, and J. C. Mogul. Rate of change and other metrics: a live study of the world wide web.
    In *USENIX Symposium on Internet Technologies and Systems*, 1997.
[15] B. Edelman. Domains reregistered for distribution of unrelated content: A case study of "Tina's Free Live Webcam".
    cyber.law.harvard.edu/people/edelman/renewals/, 2002.
[16] D. Fetterly, M. Manasse, M. Najork, and J. L. Wiener. A large-scale study of the evolution of web pages. In *Proceedings of the 12th International World Wide Web Conference*, pages 669-678, 2003.
[17] R. Fielding, J. Gettys, J. Mogul, H. Frystyk, L. Masinter, P. Leach, and T. Berners-Lee.RFC2616: Hypertext Transfer Protocol—HTTP/1.1.
    www.w3.org/Protocols/rfc2616/rfc2616.html, June 1999.
[18] T. Haveliwala. Topic-sensitive PAGERANK. In *Proceedings of the 11th International World Wide Web Conference*, pages 517-526, 2002.
[19] M. Henzinger, A. Heydon, M. Mitzenmacher, and M. Najork. On near-uniform URL sampling. *WWW9/Computer Networks*, 33(1-6):295-308, 2000.
[20] A. Jesdanun. Internet littered with dead web sites.
    story.news.yahoo.com/news?tmpl=story&u=/ap/20031102/ap_on_hi_te/dead wood_online_1, November 2002.
[21] J. M. Kleinberg. Authoritative sources in a hyperlinked environment.
    *Journal of the ACM*, 46(5):604-632, 1999.
[22] W. Koehler. An analysis of web page and web site constancy and permanence. *Journal of the American Society for Information Science*, 50(2):162-180, 1999.
[23] W. Koehler. Digital libraries and world wide web sites and page persistence. *Information Research*, 4(4), 1999.
[24] K. Kokoszkiewicz (a.k.a. Alectorides Conradus). Vocabula Computatralia Anglico-Latinum. University of Warsaw, Centre for Studies on the Classical Tradition in Poland and East-Central Europe (OBTA).
    www.obta.uw.edu.pl/~draco/docs/voccomp.html.
[25] R. Kumar, P. Raghavan, S. Rajagopalan, D. Sivakumar, A. Tomkins, and
    E. Upfal. Stochastic models for the web graph.
    In *Proceedings of the 41st IEEE Annual Foundations of Computer Science*, pages 57-65, 2000.
[26] J. Markwell and D. W. Brooks. Broken links: The ephemeral nature of educational WWW hyperlinks. *Journal of Science Education and Technology*, 11(2):105-108, 2002.

[27] J. Markwell and D. W. Brooks. "Link rot" limits the usefulness of web-based educational materials in biochemistry and molecular biology. *Biochemistry and Molecular Biology Education,* 31(1):69-72, 2003.

[28] A. Ntoulas, J. Cho, and C. Olston. What's new on the web? The evolution of the web from a search engine perspective. In *Proceedings of the* 13*th International World Wide Web Conference,* 2004.

[29] G. Pandurangan, P. Raghavan, and E. Upfal. Using PAGERANK to characterize web structure. In *Computing and Combinatorics: 8th Annual International Conference,* pages 330-339, 2002.

[30] P. Rusmevichientong, D. M. Pennock, S. Lawrence, and C. L. Giles. Methods for sampling pages uniformly from the world wide web. In *Proceedings of the AAAI Fall Symposium on Using Uncertainty Within Computation,* pages 121-128, 2001.

[31] J. L. Wolf, M. S. Squillante, P. S. Yu, J. Sethuraman, and L. Ozsen. Optimal crawling strategies for web search engines. In *Proceedings of the* 11*th International World Wide Web Conference, pages* 136-147, 2002.

APPENDIX A

```
Function bool DeadPage(u)
In URL u
  1:    string T_u, T_r, int K_u, K_r, bool error
  2:    fetch (u, w_u, T_u, K_u, error)
  3:    if (error) then            // a hard 404 error
  4:        return true
  5:    URL r = u.PARENT + 25 random characters
  6:    fetch(r, w_r, T_r, K_r, error)
  7:    if (error) then            // host returns a hard-404 on dead pages
  8:        return false
  9:    if (u is the root of u.HOST) then
 10:        return false           // a root cannot be a soft-404
 11:    if (K_u ≠ K_r) then        // different number of redirects
 12:        return false
 13:    if (w_u = w_r) then        // same redirects & same number of
                                    redirects
 14:        return true
 15:    if (shingle(T_u) = shingle(T_r)) then   // almost-identical
                                                    content
 16:        return true
 17:    return false               // not a soft-404 page
Function fetch (u, T_u, w_u, K_u, error)
in: URL u
out: string T_u, URL w_u, int K_u, bool error
  1:    w_u := u
  2:    K_u := 0
  3:    set <URL> redirects
  4:    redirects.insert(u)
  5:    while (true) do
  6:        URL v, bool redirect
  7:        atomicFetch (w_u, T_u, v, redirect, error)
  8:        if (error) then
  9:            return             // A hard-404
 10:        if (!redirect) then    // no more redirects
 11:            return
 12:        if (redirects.find(v)) then   // a redirect loop
 13:            error = true; return
 14:        if (K_u ≧ 20) then     // too many redirects
 15:            error = true; return
 16:        w_u := v, K_u := K_u + 1
 17:    end while
Function atomic fetch (w, T, v, redirect, error)
in: URL w
out: string T, URL v, bool redirect, bool error
  1:    parse (w, error)
  2:    if (error) then            // parse URL failed
  3:        return
  4:    IP Address address
  5:    getIPAddress (w.HOST, address, error)
  6:    if (error) then            // resolution of host's IP address failed
```

APPENDIX A-continued

```
  7:        return
  8:    HTTPRetCode code
  9:    httpGet (address, T, v, code, timeout = 10 sec, error)
 10:    if (error) then            // http got timed out
 11:        return
 12:    if (code in {403, 404, 410, 5xx}) then   // bad http return code
 13:        error = true; return
 14:    if (code in {3xx}) then
 15:        redirect := true
 16:    else
 17:        redirect := false
```

APPENDIX B

1. Business_and_Economy/Classifieds
2. Business_and_Economy/Employment_and_Work/Organizations
3. Computers_and_Internet/News_and_Media/Magazines
4. Computers_and_Internet/News_and_Media/Magazines
5. News_and_Media/Journalism
6. News_and_Media/Television/Satellite
7. Entertainment/Music/Band_Naming
8. Entertainment/Humor
9. Recreation/Automotive
10. Recreation/Gambling
11. Health/Medicine
12. Health/Nursing
13. Health/Fitness
14. Government/Military/Weapons_and_Equipment
15. Government/Law
16. Regional/U_S_States/California/Education
17. Regional/Countries/France/Arts_and_Humanities/Museums Galleries_and_Centers
18. Society_and_Culture/Environment_and_Nature
19. Society_and_Culture/Food_and_Drink/Cooking
20. Society_and_Culture/Death_and_Dying
21. Education/Higher_Education
22. Education/K__12/Gifted_Youth/Schools
23. Arts/Visual_Arts/Photography/Digital
24. Arts/Humanities/Literature/Poetry
25. Science/Computer_Science/Electronic_Computer_Aided_Design_ECAD__
26. Science/Biology/Zoology/Animals Insects and_Pets/Pets/Health
27. Social_Science/Psychology/Branches/Sleep_and_Dreams
28. Social_Science_Anthropology_and_Archaeology
29. Reference/Quotations
30. Reference/Dictionaries

We claim:

1. A signal-bearing medium tangibly embodying a program of machine-readable instructions executable by a digital processing apparatus of a computer system to perform operations for assessing the currency of a web page, the operations comprising:

establishing a link threshold, wherein a web page will be assessed as lacking currency if a percentage of hyperlinks contained in the web page that link to an active page is less than the link threshold;

accessing a web page containing hyperlinks;

testing the hyperlinks, wherein testing the hyperlinks comprises:

selecting one of the hyperlinks;

saving a web page returned in response to following the selected hyperlink;

formulating a web page request to a host of the selected hyperlink, where the web page request is of a form that will not return an active web page with a high degree of probability;

saving a web page returned in response to the web page request;

comparing the web page returned in response to the web page request to the web page returned in response to the following the selected hyperlink; and assessing the selected hyperlink as linking to a dead web page if the web page returned in response to following the selected hyperlink is identical to the web page returned in response to the web page request;

calculating a percentage of hyperlinks that return active web pages; and comparing the percentage of hyperlinks that return active web pages with the link threshold.

2. The signal-bearing medium of claim 1 where the operations further comprise:

identifying the web page as lacking currency if the percentage of hyperlinks that return active web pages is less than the link threshold.

3. The signal-bearing medium of claim 1 where the operations further comprise:

identifying the web page as being current if the percentage of hyperlinks that return active web pages is greater than the link threshold.

4. The signal-bearing medium of claim 1 where testing the hyperlinks further comprises:

establishing a time out limit for testing a hyperlink, where when the hyperlink is tested, the hyperlink will be assessed as linking to a dead web page if the time out limit is exceeded;

selecting a hyperlink; and monitoring the elapsed time until a web page is returned, if at all.

5. The signal-bearing medium of claim 4 where testing the hyperlinks further comprises:

assessing the hyperlink as linking to a dead page if the time out limit is exceeded.

6. The signal-bearing medium of claim 1 where testing the hyperlinks further comprises:

selecting a hyperlink; and assessing the hyperlink as linking to a dead page based on an HTTP code returned in response to an HTTP request targeting the selected hyperlink.

7. The signal-bearing medium of claim 1 where testing the hyperlinks further comprises:

establishing a redirect limit for testing a hyperlink, where when the hyperlink is tested, the hyperlink will be assessed as linking to a dead web page if the redirect limit is exceeded;

selecting a hyperlink; and monitoring the number of redirects before the desired web page is returned, if at all.

8. The signal-bearing medium of claim 7 where testing the hyperlinks further comprises:

assessing the hyperlink as linking to a dead page if the redirect limit is exceeded.

9. The signal-bearing medium of claim 1 where testing the hyperlinks further comprises:

assessing the first hyperlink as linking to an active web page if an HTTP error code is returned in response to the web page request.

10. The signal-bearing medium of claim 1 where the currency of a web page is assessed by additionally testing the link status of hyperlinks contained in web pages linked through a chain of at least one hyperlink to the web page whose currency is being tested, and where:

establishing a link threshold further comprises applying a sliding scale weighting factor to hyperlinks contained in web pages linked to the web page whose currency is being tested, where the weight given to a dead link decreases with the distance of the web page containing the dead link from the web page whose currency is being tested in terms of intermediate web pages; and where testing the hyperlinks further comprises testing hyperlinks in web pages linked to the web page whose currency is being tested.

11. The signal bearing medium of claim 1, wherein assessing the selected hyperlink as linking to a dead web page if the web page returned in response to following the selected hyperlink is identical to the web page returned in response to the web page request further comprises assessing the selected hyperlink as linking to a dead web page if the web page returned in response to following the selected hyperlink is identical to the web page returned in response to the web page request and addresses for both of the two identical web pages are not equivalent to a root of a website.

12. The signal bearing medium of claim 1, wherein the web page request has a form comprising a chosen location having a same directory as the selected hyperlink and a filename comprising a sequence of a predetermined number of random letters.

13. A computer system for assessing the currency of a web page, the computer system comprising:

an internet connection for connecting to the internet and for accessing web pages available on the internet;

at least one memory to store web pages retrieved from the internet and at least one program of machine-readable instructions, where the at least one program performs operations to assess the currency of a web page;

at least one processor coupled to the internet connection and to the at least one memory, where the at least processor performs the following operations when the at least one program is executed;

establishing a link threshold, wherein a web page will be assessed as lacking currency if a percentage of hyperlinks contained in the web page that link to an active page is less than the link threshold;

accessing a web page containing hyperlinks;

testing the hyperlinks, wherein testing the hyperlinks comprises:

selecting one of the hyperlinks;

saving a web page returned in response to following the selected hyperlink;

formulating a web page request to a host of the selected hyperlink, where the web page request is of a form that will not return an active web page with a high degree of probability;

saving a web page returned in response to the web page request;

comparing the web page returned in response to the web page request to the web page returned in response to the following the selected hyperlink; and assessing the selected hyperlink as linking to a dead web page if the web page returned in response to following the selected hyperlink is identical to the web page returned in response to the web page request;

calculating a percentage of hyperlinks that return active web pages; and comparing the percentage of hyperlinks that return active web pages with the link threshold.

14. The computer system for assessing the currency of a web page of claim 13 where the operations further comprise:
identifying the web page as lacking currency if the percentage of hyperlinks that return active web pages is less than the link threshold.

15. The computer system for assessing the currency of a web page of claim 13 where the operations further comprise:
identifying the web page as being current if the percentage of hyperlinks that return active web pages is greater than the link threshold.

16. The computer system for assessing the currency of a web page of claim 13 where testing the hyperlinks further comprises:
establishing a time out limit for testing a hyperlink, where when the hyperlink is tested, the hyperlink will be assessed as linking to a dead web page if the time out limit is exceeded;
selecting a hyperlink; and
monitoring the elapsed time until a web page is returned, if at all.

17. The computer system for assessing the currency of a web page of claim 16 where testing the hyperlinks further comprises:
assessing the hyperlink as linking to a dead page if the time out limit is exceeded.

18. The computer system for assessing the currency of a web page of claim 13 where testing the hyperlinks further comprises:
selecting a hyperlink; and
assessing the hyperlink as linking to a dead page based on an HTTP code returned in response to an HTTP request targeting the selected hyperlink.

19. The computer system for assessing the currency of a web page of claim 13 where testing the hyperlinks further comprises:
establishing a redirect limit for testing a hyperlink, where when the hyperlink is tested, the hyperlink will be assessed as linking to a dead web page if the redirect limit is exceeded;
selecting a hyperlink; and
monitoring a number of redirects before the desired web page is returned, if at all.

20. The computer system for assessing the currency of a web page of claim 19 where testing the hyperlinks further comprises:
assessing the hyperlink as linking to a dead web page if the redirect limit is exceeded.

21. The computer system for assessing the currency of a web page of claim 13 where testing the hyperlinks further comprises:
assessing the first hyperlink as linking to an active web page if an HTTP error code is returned in response to the web page request.

22. The computer system for assessing the currency of a web page of claim 13 where the currency of a web page is assessed by additionally testing the link status of hyperlinks contained in web pages linked through a chain of at least one hyperlink to the web page whose currency is being tested, and where:
establishing a link threshold further comprises applying a sliding scale weighting factor to hyperlinks contained in web pages linked to the web page whose currency is being tested, where the weight given to a dead link decreases with the distance of the web page containing the dead link from the web page whose currency is being tested in terms of intermediate web pages; and where
testing the hyperlinks further comprises testing hyperlinks in web pages linked from the web page whose currency is being tested.

23. The computer system of claim 13, wherein assessing the selected hyperlink as linking to a dead web page if the web page returned in response to following the selected hyperlink is identical to the web page returned in response to the web page request further comprises assessing the selected hyperlink as linking to a dead web page if the web page returned in response to following the selected hyperlink is identical to the web page returned in response to the web page request and addresses for both of the two identical web pages are not equivalent to a root of a website.

24. The computer system of claim 13, wherein the web page request has a form comprising a chosen location having a same directory as the selected hyperlink and a filename comprising a sequence of a predetermined number of random letters.

25. A computer-implemented method for assessing the currency of a web page, the method comprising:
establishing a link threshold, wherein a web page will be assessed as lacking currency if a percentage of hyperlinks contained in the web page that link to an active page is less than the link threshold;
accessing a web page containing hyperlinks;
testing the hyperlinks, wherein testing the hyperlinks comprises:
selecting one of the hyperlinks;
saving a web page returned in response to following the selected hyperlink;
formulating a web page request to a host of the selected hyperlink, where the web page request is of a form that will not return an active web page with a high degree of probability;
saving a web page returned in response to the web page request;
comparing the web page returned in response to the web page request to the web page returned in response to the following the selected hyperlink; and
assessing the selected hyperlink as linking to a dead web page if the web page returned in response to following the selected hyperlink is identical to the web page returned in response to the web page request;
calculating a percentage of hyperlinks that return active web pages; and
comparing the percentage of hyperlinks that return active web pages with the link threshold.

* * * * *